(12) United States Patent
Nishioka et al.

(10) Patent No.: US 8,270,841 B2
(45) Date of Patent: Sep. 18, 2012

(54) QUANTUM COMMUNICATION APPARATUS, QUANTUM COMMUNICATION SYSTEM AND QUANTUM COMMUNICATION METHOD

(75) Inventors: Tsuyoshi Nishioka, Tokyo (JP); Shigeki Takeuchi, Sapporo (JP); Alexandre Soujaeff, Sapporo (JP); Toshio Hasegawa, Tokyo (JP); Junnichi Abe, Tokyo (JP)

(73) Assignees: Mitsubishi Electric Corporation, Tokyo (JP); National University Corporation Hokkaido University, Sapporo-shi (JP)

( * ) Notice: Subject to any disclaimer, the term of this patent is extended or adjusted under 35 U.S.C. 154(b) by 758 days.

(21) Appl. No.: 12/376,343

(22) PCT Filed: Aug. 4, 2006

(86) PCT No.: PCT/JP2006/315490
§ 371 (c)(1),
(2), (4) Date: Feb. 4, 2009

(87) PCT Pub. No.: WO2008/015758
PCT Pub. Date: Feb. 7, 2008

(65) Prior Publication Data
US 2010/0226659 A1    Sep. 9, 2010

(51) Int. Cl.
*H04B 10/00* (2006.01)
(52) U.S. Cl. ........ 398/140; 398/154; 398/183; 398/208; 398/135; 398/136; 380/256; 380/255; 380/278; 380/283; 380/279
(58) Field of Classification Search .......... 398/140, 398/141, 183, 186, 182, 200, 187, 154, 155, 398/202, 208, 209, 135, 136, 138, 139, 158, 398/159, 212, 213, 214; 380/256, 278, 283, 380/277, 255, 279, 263, 44, 46
See application file for complete search history.

(56) References Cited

U.S. PATENT DOCUMENTS
5,675,648 A    10/1997 Townsend
(Continued)

FOREIGN PATENT DOCUMENTS
GB    2 419 248 A    4/2006
(Continued)

OTHER PUBLICATIONS

Toliver, P. et al., "Experimental Investigation of Quantum Key Distribution Through Transparent Optical Switch Elements", IEEE Photonics Technology Letters, vol. 15, No. 11, pp. 1669-1671, (2003).

(Continued)

*Primary Examiner* — Hanh Phan
(74) *Attorney, Agent, or Firm* — Oblon, Spivak, McClelland, Maier & Neustadt, L.L.P.

(57) ABSTRACT

The present invention is directed to realize a stable and highly-efficient quantum communication without being influenced by the jitter of the heralding signal. In regard to the quantum encryption transmitting apparatus 200, the pulse-driven heralded single-photon source 201 generates a photon pair, outputs one photon of the photon pair, and outputs the other photon of the photon pair as a heralding signal. The timing adjuster 202 synchronizes the heralding signal with a clock signal for pulse driving the pulse-driven heralded single-photon source 201, and outputs as a trigger signal. The quantum communication modulating unit 203 implements the signal modulation to a quantum signal, in timing with the trigger signal, and transmits the quantum signal to the quantum encryption receiving apparatus 300 via the quantum communication path 101. The heralding signal transmitting unit 205 transmits the heralding signal to the quantum encryption receiving apparatus 300 via the heralding signal communication path 102. The clock signal transmitting unit 206 transmits the clock signal to the quantum encryption receiving apparatus 300 via the clock communication path 103.

17 Claims, 16 Drawing Sheets

U.S. PATENT DOCUMENTS

| | | | |
|---|---|---|---|
| 7,242,774 B1* | 7/2007 | Elliott et al. | 380/256 |
| 7,359,514 B2* | 4/2008 | Trifonov et al. | 380/256 |
| 7,502,476 B1* | 3/2009 | Trifonov et al. | 380/283 |
| 2006/0093376 A1* | 5/2006 | Mitchell et al. | 398/183 |
| 2006/0274401 A1 | 12/2006 | Inoue | |
| 2009/0016736 A1* | 1/2009 | Beal et al. | 398/144 |

FOREIGN PATENT DOCUMENTS

| | | |
|---|---|---|
| WO | WO 94/15422 A1 | 7/1994 |
| WO | WO 2006/130300 A2 | 12/2006 |

OTHER PUBLICATIONS

Soujaeff, A. et al., "Heralded single photon source for quantum cryptography at 1550 nm", European Quantum Electronics Conference, p. 285, (2005).

Inoue, K. "Quantum key distribution using a series of quantum correlated photon pairs", Physical Review A, vol. 71, pp. 032301-1-032301-6, (2005).

Townsend, P.D. "Secure key distribution system based on quantum cryptography", Electronics Letters, vol. 30, No. 10, pp. 809-810, (1994).

Trifonov, A. et al., "Secure communication with a heralded single-photon source", Journal of Optics B: Quantium and Semiclassical Optics, vol. 7, pp. S772-S777, (2005).

Fasel, S. et al., "High-quality asynchronous heralded single-photon source at telecom wavelength", New Journal of Physics, vol. 6, pp. 1-11, (2004).

Extended Supplementary European Search Report dated Oct. 22, 2010 in corresponding European Application No. 06 78 2348.

Tomoyuki Horikiri et al., "Quantum Key Distribution with a Heralded Single Photon Source and a Photon Number Resolving Detector", Lasers and Electro-Optics and 2006 Quantum Electronics and Laser Science Conference, CLEO/QELS 2006, May 21, 2006, XP 031394918, 2 Pages.

T. Horikiri et al., "Quantum Key Distribution with a Heralded Single Photon Source", Quantum Electronics Conference, Jul. 11, 2005, XP 010865888, pp. 1617-1618.

T. B. Pittman et al., "Heralding Single Photons from Pulsed Parametric Down-Conversion", Optics Communications, vol. 246, 2005, pp. 545-550.

* cited by examiner

QUANTUM COMMUNICATION APPARATUS, QUANTUM COMMUNICATION SYSTEM AND QUANTUM COMMUNICATION METHOD

TECHNICAL FIELD

The present invention relates to a quantum communication apparatus, a quantum communication system and a quantum communication method. Particularly, the present invention relates to a quantum encryption communication apparatus.

BACKGROUND ART

A conventional quantum encryption communication apparatus utilizing a heralded single-photon source transmits a heralding signal output from the single-photon source from a transmitting apparatus to a receiving apparatus. In the transmitting apparatus, a quantum signal modulating operation is performed by using the heralding signal as a trigger. Also, in the receiving apparatus, a photon detecting operation and a quantum signal demodulating operation are implemented by using the transmitted heralding signal as a trigger (e.g., refer to non-patent documents 1 and 2).

A heralded single-photon source is a system that generates a twin-photon pair by using a parametric down conversion and the like, confirms, by measuring one photon of the pair, a presence of the other photon of the pair without having to measure it, and uses it as a single-photon source. Here, a measurement output of one photon of the pair that has been measured is output as a heralding signal notifying an output of the other photon of the pair. As a pump light source generating the parametric down conversion and the like, a continuous wave (CW) laser (e.g., non-patent document 1) or a pulse laser is utilized. In either one, a twin-photon pair is generated as a probabilistic generation phenomenon. Hence, in the way of a photon source, a single photon ends up being generated at an irregular time interval.

A reason why the heralded single-photon source is preferably used in quantum encryption is because it is a light source having less probability of generating a multi-photon state and having greater single-photon property than a conventional one that reduces laser light. When a typical photon detector currently being utilized in quantum encryption is used, a security cannot be assured over a communication distance of about 25 km (kilometers) if the laser light is utilized as the single-photon source. On the other hand, for a case of the heralded single-photon source, a security is assured even at a distance exceeding 50 km since it has greater single-photon property.

Specifically, in the heralded single-photon source, in general, by reducing an intensity of the pump light, two-photon presence probability $P(2)$ for an optical pulse specified by the heralding signal can arbitrarily be made small while maintaining one-photon presence probability $P(1)$. Therefore, a security of the quantum encryption similar to the case of using an ideal single-photon source can be realized.

Non-patent document 1: A. Trifonov and A. Zavriyev, "Secure communication with a heralded single-photon source," Journal of Optics B: Quantum Semiclass, Opt. 7 No 12 (December 2005) S772-S777, 23 Nov. 2005

Non-patent document 2: S. Fasel, O. Alibart, S. Tanzilli, P. Baldi, A. Beveratos, N. Gisin and H. Zbinden, "High-quality asynchronous heralded single-photon source at telecom wavelength," New Journal of Physics 6 (November 2004) 163, 12 Nov. 2004.

DISCLOSURE OF THE INVENTION

Problems to be Solved by the Invention

As for the conventional heralded single-photon source, a heralding signal is generated by measuring one photon of the twin-photon pair with a photon detector and, therefore, there is a problem in that a precision of the heralding signal is restricted by a performance of the photon detector used for this measurement.

For example, a light having a short wavelength of 850 nm (nanometers) or less is used as a photon which is measured as the heralding signal, and SiAPD (Silicon Avalanche Photodiode) is preferably used for detecting this photon. As for the photon detector known as SPCM (Single Photon Counting Module) that uses the SiAPD, there is a fluctuation of about 500 ps (picoseconds) as a jitter. For this reason, for a single photon, the heralding signal has a jitter of 500 ps. In the quantum encryption, a single photon in the communication wavelength band of 1.55 µm (micrometers) is normally used and the photon detector in this wavelength band (a communication wavelength band photon detector) adopts a system operating in timing with a photon incidence, which is known as a gate type geigar mode, and thus the jitter of the heralding signal gives an influence that cannot be ignored. Actually, the communication wavelength band photon detector realizes an optimal operation by setting a timing in 100-ps units and, therefore, a jitter of SPCM above has a size that cannot be ignored.

The present invention is directed to provide a stable and highly-efficient quantum communication without being influenced by the jitter of the heralding signal.

Means to Solve the Problems

A quantum communication apparatus according to one aspect of the present invention is a quantum communication apparatus for transmitting a photon output as a quantum signal, from a single-photon source that outputs a photon by pulse driving, via a quantum communication path, including:

a timing adjusting unit that outputs as a trigger signal, a heralding signal indicating a presence of the quantum signal output from the single-photon source on the quantum communication path, in synchronization with a clock signal for pulse driving the single-photon source;

a quantum signal modulating unit that implements a signal modulation to the quantum signal, in timing with the trigger signal output from the timing adjusting unit, and transmits a quantum signal to which the signal modulation has been implemented, via the quantum communication path; and a heralding signal transmitting unit that transmits the heralding signal via a heralding signal communication path.

The quantum communication apparatus further includes:

a clock signal transmitting unit that transmits the clock signal via a clock communication path.

The quantum communication apparatus further includes:

a clock signal receiving unit that receives the clock signal via a clock communication path, wherein the timing adjusting unit outputs as the trigger signal, the heralding signal in synchronization with the clock signal received at the clock signal receiving unit.

The quantum communication apparatus further includes:

a signal generating unit that generates a photon pair by the single-photon source, outputs one photon of the photon pair as the quantum signal, and outputs the other photon of the photon pair as the heralding signal, wherein the quantum signal modulating unit implements the signal modulation to the quantum signal output from the signal generating unit, and the heralding signal transmitting unit transmits the heralding signal output from the signal generating unit.

The quantum communication apparatus wherein the signal generating unit generates the photon pair by a parametric down conversion.

The quantum communication apparatus wherein the signal generating unit performs a logical AND operation of the heralding signal output from the single-photon source and the clock signal, and outputs a result of the logical AND operation once again as the heralding signal.

The quantum communication apparatus wherein the signal generating unit controls the heralding signal output from the single-photon source by the clock signal, and outputs a heralding signal controlled.

A quantum communication apparatus according to another aspect of the present invention is a quantum communication apparatus for receiving a photon output as a quantum signal, from a single-photon source that outputs a photon by pulse driving, via a quantum communication path, including:

a heralding signal receiving unit that receives a heralding signal indicating a presence of the quantum signal output from the single-photon source, via a heralding signal communication path;

a timing adjusting unit that outputs as a trigger signal, the heralding signal received by the heralding signal receiving unit in synchronization with a clock signal for pulse driving the single-photon source; and a quantum signal detecting unit that detects the quantum signal present on the quantum communication path, in timing with the trigger signal output from the timing adjusting unit.

The quantum communication apparatus further includes:

a clock signal receiving unit that receives the clock signal via a clock communication path, wherein the timing adjusting unit outputs as the trigger signal, the heralding signal received at the heralding signal receiving unit in synchronization with the clock signal received at the clock signal receiving unit.

The quantum communication apparatus further includes:

a clock signal transmitting unit that transmits the clock signal via a clock communication path.

The quantum communication apparatus wherein the quantum signal detecting unit includes a quantum signal demodulating unit that implements a signal demodulation to the quantum signal present on the quantum communication path, in timing with the trigger signal output from the timing adjusting unit, and detects a quantum signal to which the signal demodulation has been implemented by the quantum signal demodulating unit, in timing with the trigger signal output from the timing adjusting unit.

The quantum communication apparatus wherein the quantum signal detecting unit includes a quantum signal diverging unit for diverging the quantum communication path, and detects a quantum signal present on a quantum communication path which is diverged by the quantum signal diverging unit, in timing with the trigger signal output from the timing adjusting unit.

A quantum communication system according to one aspect of the present invention is a quantum communication system for transmitting and receiving a photon output as a quantum signal, from a single-photon source that outputs a photon by pulse driving, including:

a quantum communication path for conveying the quantum signal output from the single-photon source;

a heralding signal communication path for conveying a heralding signal indicating that the quantum signal is present on the quantum communication path;

a first quantum communication apparatus which includes a first timing adjusting unit that outputs as a first trigger signal, the heralding signal in synchronization with a clock signal for pulse driving the single-photon source, a quantum signal modulating unit that implements a signal modulation to the quantum signal, in timing with the first trigger signal output from the first timing adjusting unit, and transmits a quantum signal to which the signal modulation has been implemented, via the quantum communication path, and a heralding signal transmitting unit that transmits the heralding signal via the heralding signal communication path; and a second quantum communication apparatus which includes a heralding signal receiving unit that receives the heralding signal transmitted by the heralding signal transmitting unit via the heralding signal communication path, a second timing adjusting unit that outputs as a second trigger signal, the heralding signal received by the heralding signal receiving unit in synchronization with the clock signal, and a quantum signal detecting unit that detects the quantum signal transmitted onto the quantum communication path by the quantum signal modulating unit, in timing with the second trigger signal output from the second timing adjusting unit.

The quantum communication system further includes: a clock communication path for conveying the clock signal;

wherein the first quantum communication apparatus further includes a clock signal transmitting unit that transmits the clock signal via the clock communication path, the second quantum communication apparatus further includes a clock signal receiving unit that receives the clock signal transmitted by the clock signal transmitting unit, via the clock communication path, and the second timing adjusting unit outputs as the second trigger signal, the heralding signal received at the heralding signal receiving unit in synchronization with the clock signal received at the clock signal receiving unit.

The quantum communication system further including: a clock communication path for conveying the clock signal, wherein the second quantum communication apparatus further includes a clock signal transmitting unit that transmits the clock signal via the clock communication path, the first quantum communication apparatus further includes a clock signal receiving unit that receives the clock signal transmitted by the clock signal transmitting unit via the clock communication path, the first timing adjusting unit outputs as the first trigger signal, the heralding signal in synchronization with the clock signal received by the clock signal receiving unit.

The quantum communication system wherein the quantum communication path uses a dispersion compensation fiber subsequently to an optical fiber.

A quantum communication method according to one aspect of the present invention is a quantum communication method for transmitting and receiving a photon output as a quantum signal, from a single-photon source that outputs a photon by pulse driving, via a quantum communication path, including:

outputting as a first trigger signal, a heralding signal that indicates a presence of the quantum signal on the quantum communication path in synchronization with a clock signal for pulse driving the single-photon source, at a first quantum communication apparatus;

implementing a signal modulation to the quantum signal, in timing with the first trigger signal output by the outputting of the first trigger signal, and transmitting a quantum signal to which the signal modulation has been implemented via the quantum communication path, at the first quantum communication apparatus;

transmitting the heralding signal via the heralding signal communication path, at the first quantum communication apparatus;

receiving the heralding signal transmitted by the transmitting of the heralding signal, via the heralding signal communication path, at a second quantum communication apparatus;

outputting as a second trigger signal, the heralding signal received by the receiving of the heralding signal in synchronization with the clock signal, at the second quantum communication apparatus; and detecting the quantum signal transmitted onto the quantum communication path by the transmitting of the quantum signal, in timing with the second trigger signal output by the outputting of the second trigger signal, at the second quantum communication apparatus.

Effects of the Invention

According to one aspect of the present invention, in the quantum communication apparatus, the timing adjusting unit outputs as a trigger signal, the heralding signal in synchronization with the clock signal for pulse driving the single-photon source. The quantum communication modulating unit implements a signal modulation to the quantum signal, in timing with the trigger signal, and transmits the quantum signal via the quantum communication path. The heralding signal transmitting unit transmits the heralding signal via the heralding signal communication path. Therefore, without being influenced by the jitter of the heralding signal, a stable and highly-efficient quantum communication can be provided.

PREFERRED EMBODIMENTS FOR CARRYING OUT THE INVENTION

Hereinbelow, the embodiments of the present invention are described with reference to the drawings.

First Embodiment

FIG. 1 is a block diagram showing a configuration of a quantum communication system 100 of the present embodiment.

Referring to FIG. 1, the quantum communication system 100 (also referred to as "quantum encryption communication system") includes a quantum encryption transmitting apparatus 200, a quantum encryption receiving apparatus 300, a quantum communication path 101 (also referred to as "quantum signal communication path"), a heralding signal communication path 102, and a clock communication path 103 (also referred to as "pulse clock communication path" or "pulse clock signal communication path") that connect the two apparatuses.

The quantum communication path 101 is a communication path that conveys a photon as a quantum signal. For a case in which the quantum communication path 101 uses an optical fiber to communicate in long distance, a dispersion compensation fiber 104 may be connected subsequently to it in order to compensate a collapse in an optical pulse waveform, which is associated with a wavelength dispersion peculiar to the optical fiber. The heralding signal communication path 102 is a communication path that conveys a heralding signal which will be described later. The clock communication path 103 is a communication path that conveys a clock signal (also referred to as "pulse clock signal") which will be described later. The heralding signal communication path 102 and the clock communication path 103 may be optical communication paths or may be communication paths of electric signals.

The quantum encryption transmitting apparatus 200 is one example of the quantum communication apparatus, and it includes a pulse-driven heralded single-photon source 201, a quantum signal modulating unit 203, a heralding signal transmitting unit 205, a clock signal transmitting unit 206, and a timing adjuster 202. The pulse-driven heralded single-photon source 201 is one example of a signal generating unit. The quantum signal modulating unit 203 includes a quantum signal modulator 204 which adds the signal modulation to a quantum state of a single photon output from the pulse-driven heralded single-photon source 201. The heralding signal transmitting unit 205 is a transceiver or a transmitter for transmitting the heralding signal output from the pulse-driven heralded single-photon source 201 to the heralding signal communication path 102. The clock signal transmitting unit 206 is a transceiver or a transmitter for transmitting the clock signal of a pulse laser serving as a pump source of the pulse-driven heralded single-photon source 201 to the clock communication path 103. The timing adjuster 202 is one example of a first timing adjusting unit and it generates a first trigger signal (also simply referred to as "trigger signal") given to the quantum signal modulator 204 by synchronizing the heralding signal with the pulse clock signal.

The heralding signal is a signal output at irregular intervals in synchronization with the single photon, which has a jitter in between itself and the single photon that cannot be ignored. On the other hand, since the pulse clock signal is a clock signal of the pulse laser of the pump light source, it is output regularly even at a time slot where the single photon is not output. Note that a jitter in between the pulse clock signal and the single photon is extremely small. In case of using a femtosecond pulse laser as the pump light source, the jitter is 1 ps or less.

The quantum encryption receiving apparatus 300 is one example of the quantum communication apparatus, and it includes a quantum signal detecting unit 304, a heralding signal receiving unit 301, a clock signal receiving unit 302, and a timing adjuster 303. The quantum signal detecting unit 304 includes a photon detector 306 for detecting a photon that is transferred through the quantum communication path 101, and a quantum signal demodulator 305 for performing a signal demodulation to the quantum state of the photon that is transferred through the quantum communication path 101. The quantum signal demodulator 305 is one example of a quantum signal demodulating unit. The heralding signal receiving unit 301 is a receiver or a transceiver for receiving the heralding signal that is transferred through the heralding signal communication path 102. The clock signal receiving unit 302 is a receiver or a transceiver for receiving the pulse clock signal that is transferred through the clock communication path 103. The timing adjuster 303 is one example of a second timing adjusting unit, and it synchronizes the heralding signal received at the heralding signal receiving unit 301 with the pulse clock signal received at the clock signal receiving unit 302, and generates a second trigger signal (also simply referred to as "trigger signal") given to the photon detector 306 and the quantum signal demodulator 305.

A high-speed operation with a low jitter is desired in a transmitter (i.e., the clock signal transmitting unit 206) and a receiver (i.e., the clock signal receiving unit 302) used for the clock communication path 103. Therefore, depending on the circumstances, a configuration of the clock communication path 103, in which a part of the pulse laser light output from the pump light source of the pulse-driven heralded single-photon source 201 is diverged, its wavelength is converted into a wavelength appropriate for the communication path if needed, and it is transferred by using an optical fiber, may be employed.

In the quantum encryption, a secure communication is realized by randomly selecting mutually conjugate measurement means. In case of actively selecting the measurement means at the receiving side, in the quantum signal detecting unit 304, the quantum signal demodulator 305 is used. In case of passively selecting the measurement means, a configuration, where the photon detectors 306 used for the measurement are increased instead of using the quantum signal demodulator 305, is employed. The former configuration is illustrated in FIG. 1. The latter configuration is described in a third embodiment and onwards.

FIG. 2 is a drawing showing one example of a quantum encryption optical system that actively selects a measurement means at the receiving side. For simplicity, a control system is omitted in FIG. 2. FIG. 2 illustrates one example of a configuration of the quantum signal modulating unit 203 and the quantum signal detecting unit 304, especially.

In the quantum encryption transmitting apparatus 200, the quantum state is actively specified and transmitted by using a phase modulator 208. Also in the quantum encryption receiving apparatus 300, the quantum state is actively measured by using a phase demodulator 307. Moreover, a non-symmetrical Mach-Zehnder interferometer 308 corresponding to previously set and fixed measurement means is placed next to the phase demodulator 307, and it leads to photon detectors 306a and 306b corresponding to the measurement means. In this example, in the quantum signal modulating unit 203 of the quantum encryption transmitting apparatus 200, a non-symmetrical Mach-Zelmder interferometer 207 is used before the phase modulator 208, in order to perform processing of the signal modulation. Moreover, in this example, the phase modulator 208 is used as one example of the quantum signal modulator 204, but a polarization modulator and the like may be used instead. Moreover, in this example, in the quantum signal detecting unit 304 of the quantum encryption receiving apparatus 300, the phase demodulator 307 is used as one example of the quantum signal demodulating unit, but a polarization demodulator and the like may be used instead.

For example, in case of performing the quantum encryption communication of a certain 2-bit information, in the quantum encryption transmitting apparatus 200, an input device which is not illustrated inputs the 2-bit information to a processing device which is not illustrated. Alternatively, a storage device which is not illustrated may store this 2-bit information, and the processing device may read this 2-bit information from the storage device. The processing device converts the 2-bit information into an electric signal, and inputs it to the quantum signal modulating unit 203. The quantum signal modulating unit 203 implements the signal modulation to one photon of the photon pair output from the pulse-driven heralded single-photon source 201, based on the electric signal input from the processing device, by using the non-symmetrical Mach-Zehnder interferometer 207 and the phase demodulator 208. Specifically, the phase modulator 208 performs a phase modulation of the photon at four kinds of phase differences {0, π/2, π(3/2)π}. In this way, 2-bit signal modulation is implemented to that photon. The photon to which such a signal modulation has been implemented is transferred from the quantum encryption transmitting apparatus 200 to the quantum encryption receiving apparatus 300, via the quantum communication path 101.

In the quantum encryption receiving apparatus 300, the quantum signal detecting unit 304 generates a 1-bit random number by using a random number generator which is not illustrated, and inputs the generated 1-bit random number to the phase demodulator 307. The quantum signal detecting unit 304 implements the signal demodulation to the photon transferred through the quantum communication path 101, based on an electric signal of the inputted 1-bit random number, by using the phase demodulator 307. Specifically, the phase demodulator 307 performs 0 or π/2 phase modulation (i.e., the phase demodulation) of a photon depending on a value of the 1-bit random number (e.g., if the value of the 1-bit random number is "1," π/2 phase modulation is performed). In this way, the signal demodulation is implemented to that photon. The photon detector 306a and the photon detector 306b are connected to the phase demodulator 307 via the non-symmetrical Mach-Zehnder interferometer 308. The quantum signal detecting unit 304 specifies a value of one bit of the 2-bit information, depending on whether the photon detector 306a or the photon detector 306b has detected the photon to which the signal demodulation has been implemented. The bit specified here becomes valid if the remaining one bit of the 2-bit information carries the same value as the 1-bit random number. For example, the photon detector 306a may detect a photon having a phase difference of 0, and the photon detector 306b may detect a photon having a phase difference of π. In this case, when the phase difference of the photon transferred through the quantum communication path 101 is either 0 or π and the phase demodulator 307 carries out 0 phase modulation (i.e., does not carry out phase modulation), a bit specified by the quantum signal detecting unit 304 becomes valid. On the other hand, when the phase difference of the photon transferred through the quantum communication path 101 is either π/2 or (3/2)π and the phase demodulator 307 carries out π/2 phase demodulation, a bit specified by the quantum signal detecting unit 304 becomes valid. An output device which is not illustrated outputs the bit specified by the quantum signal detecting unit 304. The processing device which is not illustrated may carry out a predetermined processing by using this bit. This bit, for example, can be utilized as key information or a part of key information.

FIG. 3 is a timing chart illustrating one example of the quantum encryption communication of the present embodiment.

At first, pulse clock signals ("transmitting side clock signals") are regularly output from the pulse-driven heralded single-photon source 201 included in the quantum encryption transmitting apparatus 200. Note that generation of a single photon occurs probabilistically, and thus outputs of the single photon and the heralding signal ("transmitting side heralding signal") associated with it occur irregularly. At that time, a timing of the generation of the single photon is synchronous with the pulse clock signal very precisely. However, when being synchronized with the timing of the single photon generation and the pulse clock signal, the heralding signal has a jitter in 500-ps units.

The timing adjuster 202 included in the quantum encryption transmitting apparatus 200 takes in the heralding signal and the pulse clock signal, and it outputs a first trigger signal ("quantum signal modulation trigger signal") precisely synchronous to the pulse clock signal, only when the heralding signal is input, and operates the quantum signal modulator 204. In this way, the single photon output from the pulse-driven heralded single-photon source 201 precisely receives the signal modulation.

Next, by using the clock signal transmitting unit 206 and the heralding signal transmitting unit 205 included in the quantum encryption transmitting apparatus 200, the pulse clock signal and the heralding signal are transferred to the quantum encryption receiving apparatus 300 via the clock communication path 103 and the heralding signal communication path 102, respectively. At that time, the single photon that received the signal modulation is transferred to the quantum encryption receiving apparatus 300 via the quantum communication path 101.

The pulse clock signal ("receiving side clock signal") and the heralding signal ("receiving side heralding signal") transferred to the quantum encryption receiving apparatus 300 are received at the clock signal receiving unit 302 and the heralding signal receiving unit 301, respectively, and are input to the timing adjuster 303 included in the quantum encryption receiving apparatus 300. The timing adjuster 303 outputs a second trigger signal ("a photon detecting trigger signal") precisely synchronous to the pulse clock signal, only when the heralding signal is input, and operates the photon detector 306. At that time, a timing of inputting the single photon transferred to the quantum encryption receiving apparatus 300 into the photon detector 306 and an operation timing of the photon detector 306, are precisely synchronous at a low jitter, and thereby a stable and highly-efficient photon detection is possible.

Moreover, the timing adjuster 303 outputs a second trigger signal (a quantum signal demodulation trigger signal) precisely synchronous to the pulse clock signal, only when the heralding signal is input, in the same manner as the second trigger signal for the photon detector 306, and operates the quantum signal demodulator 305. In this way, a signal demodulation operation can be implemented in precise synchronization with the single photon transferred to the quantum encryption receiving apparatus 300.

As shown in FIG. 3, for example, if a clock frequency of the pulse clock signal is set to 80 MHz, an unit time of the clock is 12.5 ns. Hence, if a jitter of the heralding signal is suppressed to an extent of 5 ns, one can consider that the heralding signal can be synchronized to the pulse clock signal. As described previously, the jitter of the heralding signal is about 500 ps and, therefore, it is sufficiently possible to synchronize the heralding signal with the pulse clock signal. Moreover, as described previously, since the jitter of the pulse clock signal can be suppressed to about 1 ps, it is possible to suppress the jitter of the trigger signal generated by synchronizing the heralding signal with the pulse clock signal to about 100 ps. In this way, it becomes possible to reduce an influence of the performance of the photon detector 306 on stability and efficiency of the quantum communication.

As described above, a timing of the quantum signal modulation of the quantum encryption transmitting apparatus 200, a timing of the quantum signal demodulation of the quantum encryption receiving apparatus 300, and a timing of the photon detection are synchronized not only with the heralding signal having a jitter that cannot be ignored against a transfer timing of the single photon, but also with the pulse clock signal having an extremely small jitter against the transfer timing of the single photon. Therefore, for each single photon transferred, respective operations of the quantum signal modulation, the quantum signal demodulation, and the photon detection can be stabilized and implemented at high efficiency.

Further, although the single photon is generated probabilistically and irregularly, it is generated in precise synchronization with the pulse clock signal which is output regularly. Therefore, two photon measurement such as a Bell measurement with a photon generated from another photon source can be realized easily. By considering a fact that a communication distance limit of the existing quantum encryption communication is around 100 km, and that a communication distance can be remarkably extended by realizing a quantum repeater and a quantum relay based on the Bell measurement, the quantum communication system 100 of the present embodiment is a preferred system in using the quantum repeater and the quantum relay, making it capable of remarkably extending the communication distance.

FIG. 4 is a drawing showing one example of a hardware resource of the quantum communication apparatus (i.e., the quantum encryption transmitting apparatus 200 or the quantum encryption receiving apparatus 300) of the present embodiment.

Referring to FIG. 4, the quantum communication apparatus is a computer that includes the hardware resource such as a display apparatus 901 having a display screen such as a CRT (Cathode Ray Tube) and a LCD (Liquid Crystal Display), a keyboard 902 (K/B), a mouse 903, a FDD 904 (Flexible Disk Drive), a CDD 905 (Compact Disc Drive), and a printer apparatus 906, which are connected by cables or signal lines. Moreover, it is connected to the Internet via a LAN (Local Area Network) and a gateway.

Referring to FIG. 4, the quantum communication apparatus includes a CPU 911 (Central Processing Unit) for executing programs. The CPU 911 is one example of the processing device. The CPU 911 is connected to a ROM 913 (Read Only Memory), a RAM 914 (Random Access Memory), a communication board 915, the display apparatus 901, the keyboard 902, the mouse 903, the FDD 904, the CDD 905, the printer apparatus 906, and a magnetic disk apparatus 920, via a bus 912, and controls these hardware devices. Instead of the magnetic disk apparatus 920, a storage medium such as an optical disk apparatus and a memory card reader/writer may be used.

Example of a volatile memory includes the RAM 914. Examples of a non-volatile memory include the storage media such as the ROM 913, the FDD 904, the CDD 905 and the magnetic disk apparatus 920. These are examples of storage devices. Examples of the input device include the communication board 915, the keyboard 902, and the FDD 904. Moreover, examples of the output device include the communication board 915, the display apparatus 901, and the printer apparatus 906.

The communication board 915 is connected to the LAN and the like. The communication board 915 may also be connected to the Internet, or a WAN (Wide Area Network) such as an ISDN (Integrated Services Digital Network). The gateway is not needed in case of being connected to the Internet or the WAN.

The magnetic disk apparatus 920 stores an operating system 921 (OS), programs 923, and files 924. A program of the programs 923 is executed by the CPU 911 and the operating system 921. The programs 923 store programs that process data or information. The programs are read and executed by the CPU 911. The files 924 store data, information, signal values, variable values or parameters, which are described as "data", "information", " . . . ID (IDentifier)", " . . . flag", " . . . result" in the description of the present embodiment, as each item of " . . . file," "database" or " . . . table." " . . . file," "database" or " . . . table" are stored on the storage medium such as disk or memory. The data, information, signal values, variable values or parameters stored on the storage media such as disk or memory are read to a main memory or a cash memory by the CPU 911 via a read-write circuit, to be used in processes (operations) of the CPU 911 such as extracting, searching, referring, comparing, operating, calculating, controlling, outputing, printing, displaying and so forth on. During the CPU 911 processing such as extracting, searching, referring, comparing, operating, calculating, controlling, outputing, printing, displaying and so forth on, the data, information, signal values, variable values or parameters are temporarily stored on the main memory, the cash memory or a buffer memory.

Moreover, those elements being described as " . . . unit" and " . . . means" in the description of the present embodiment can also be " . . . circuit," " . . . apparatus" and " . . . equipment", and it can also be " . . . step," " . . . process," " . . . procedure" and " . . . processing." In other words, those elements described as " . . . unit" or " . . . means" may be implemented as a firmware stored on the ROM 913. Furthermore, they may be implemented as a combination of the software and the hardware such as elements, devices, substrates and wirings, or a combination further with the firmware. Firmware and software are stored on the storage media such as magnetic disk, flexible disk, optical disk, compact disc, mini disk, and DVD as programs. These programs are read by the CPU 911, and executed by the CPU 911.

FIG. 5 is a flow chart showing a quantum communication method of the transmitting side in which the quantum encryption transmitting apparatus 200 transmits the photon output as the quantum signal from the single-photon source where the photon is output by pulse driving, via the quantum communication path 101.

In the quantum encryption transmitting apparatus 200, the pulse-driven heralded single-photon source 201 generates the photon pair by the parametric down conversion and the like, and outputs one photon of the photon pair as the quantum signal, and also outputs the other photon of the photon pair as the heralding signal (step S101). The timing adjuster 202 outputs as the first trigger signal, the heralding signal indicating a presence of the quantum signal output from the pulse-driven heralded single-photon source 201 on the quantum communication path 101 in synchronization with the clock signal for pulse driving the pulse-driven heralded single-photon source 201 (step S102). The quantum signal modulating unit 203 implements the signal modulation to the quantum signal output from the pulse-driven heralded single-photon source 201, in timing with the first trigger signal output from the timing adjuster 202 (step S103), and transmits the quantum signal to which the signal modulation has been implemented, via the quantum communication path 101 (step S104). The heralding signal transmitting unit 205 transmits the heralding signal output from the pulse-driven heralded single-photon source 201 via the heralding signal communication path 102 (step S105). The clock signal transmitting unit 206 transmits the clock signal via the clock communication path 103 (step S106).

FIG. 6 is a flow chart showing a quantum communication method of the receiving side in which the quantum encryption receiving apparatus 300 receives the photon output as the quantum signal from the single-photon source (i.e., the pulse-driven heralded single-photon source 201 included in the quantum encryption transmitting apparatus 200) that outputs the photon by pulse driving from the quantum encryption transmitting apparatus 200, via the quantum communication path 101.

In the quantum encryption receiving apparatus 300, the heralding signal receiving unit 301 receives a heralding signal indicating the presence of the quantum signal output from the single-photon source on the quantum communication path 101, from the quantum encryption transmitting apparatus 200, via the heralding signal communication path 102 (step S201). The clock signal receiving unit 302 receives the clock signal for pulse driving the single-photon source, from the quantum encryption transmitting apparatus 200, via the clock communication path 103 (step S202). The timing adjuster 303 outputs as the second trigger signal, the heralding signal received by the heralding signal receiving unit 301 in synchronization with the clock signal received at the clock signal receiving unit 302 (step S203). The quantum signal demodulator 305 included in the quantum signal detecting unit 304 implements the signal demodulation to the quantum signal present on the quantum communication path 101, in timing with the second trigger signal output from the timing adjuster 303 (step S204). The quantum signal detecting unit 304 detects the quantum signal to which the signal demodulation has been implemented by the quantum signal demodulator 305, in timing with the second trigger signal output from the timing adjuster 303 (step S205).

As described above, according to the present embodiment, the quantum communication system 100 that performs the quantum encryption communication by using the pulse-driven heralded single-photon source 201 which outputs the heralding signal generated by the parametric down conversion and the like, is characterized in that, as well as the quantum communication path 101, the heralding signal communication path 102, and other communication paths for transferring control signals, the clock communication path 103 for transferring the clock signal of the pulse laser used as the pump source for the parametric down conversion and the like, from the quantum encryption transmitting apparatus 200 to the quantum encryption receiving apparatus 300, are provided.

The quantum encryption transmitting apparatus 200 is characterized in that the pulse-driven heralded single-photon source 201, the quantum signal modulator 204 that adds the signal modulation to the quantum state of the single photon, the heralding signal transmitting unit 205 that transmits the heralding signal output from the pulse-driven heralded single-photon source 201 to the heralding signal communication path 102, the clock signal transmitting unit 206 that transmits the pulse clock signal output from the pulse-driven heralded single-photon source 201 to the clock communication path 103, and the timing adjuster 202 that generates the trigger signal to the quantum signal modulator 204 by synchronizing, with a high precision, the heralding signal to the pulse clock signal, are provided.

The quantum encryption receiving apparatus 300 is characterized in that the photon detector 306 that detects a photon transferred through the quantum communication path 101, the heralding signal receiving unit 301 that receives the heralding signal transferred through the heralding signal communication path 102, the clock signal receiving unit 302 that receives the pulse clock signal transferred through the clock communication path 103, and the timing adjuster 303 that generates the trigger signal to the photon detector 306 by synchronizing, with a high precision, the heralding signal to the pulse clock signal, are provided.

The quantum encryption receiving apparatus 300 is characterized in that the quantum signal demodulator 305 that implements the signal demodulation to the photon propagating through the quantum communication path 101, and the timing adjuster 303 that generates the trigger signal to the quantum signal modulator 305 by synchronizing, with a high precision, the heralding signal to the pulse clock signal, are provided.

The quantum communication system 100 is characterized in that the dispersion compensation fiber 104 is used subsequently to the optical fiber serving as the quantum communication path 101.

As described above, by using the quantum communication apparatus of the present embodiment, a stable and highly-efficient quantum communication can be realized without being influenced by the jitter of the heralding signal. Moreover, the quantum communication apparatus of the receiving side employs a configuration having a small number of photon detectors and, therefore, the configuration becomes relatively compact. The cost also becomes relatively low.

Second Embodiment

The present embodiment, mainly differences from the first embodiment, will be described.

The first embodiment employs the configuration in which the pulse laser serving as the pump light source of the pulse-driven heralded single-photon source 201 is used as a master clock. In the present embodiment, a clock is shared at a low jitter in between the two quantum encryption communication apparatuses, and the pulse laser serving as the pump light source is synchronized and driven by using the shared clock as a master.

According to the first embodiment, in the quantum communication system 100, the clock signal that synchronizes the heralding signal for generating the trigger signal is transmitted from the quantum encryption transmitting apparatus 200 to the quantum encryption receiving apparatus 300. However, in the present embodiment, it is transmitted from the quantum encryption receiving apparatus 300 to the quantum encryption transmitting apparatus 200.

FIG. 7 is a block diagram showing a configuration of the quantum communication system 100 of the present embodiment.

The main difference from FIG. 1 described in the first embodiment resides in that the quantum encryption transmitting apparatus 200 includes a clock signal receiving unit 209 in place of the clock signal transmitting unit 206, and the quantum encryption transmitting apparatus 300 includes a clock signal transmitting unit 309 in place of the clock signal receiving unit 302.

In the quantum encryption receiving apparatus 300, the clock signal transmitting unit 309 is a transceiver or a transmitter for transmitting a clock signal generated by a built-in clock in the timing modulator 303 to the clock communication path 103. The timing adjuster 303 synchronizes a heralding signal received by the heralding signal receiving unit 301 with the clock signal generated by a built-in clock in itself, and generates a second trigger signal given to the photon detector 306 and the quantum signal demodulator 305.

In the quantum encryption transmitting apparatus 200, the clock signal receiving unit 209 is a receiver or a transceiver for receiving the clock signal transferred through the clock communication path 103. The timing adjuster 202 synchronizes the heralding signal output from the pulse-driven heralded single-photon source 201 with the clock signal received at the clock signal receiving unit 209, and generates a first trigger signal given to the quantum signal modulator 204.

FIG. 8 is a flow chart illustrating the quantum communication method of the transmitting side.

In regard to the quantum encryption transmitting apparatus 200, the clock signal receiving unit 209 receives the clock signal for pulse driving the pulse-driven heralded single-photon source 201, from the quantum encryption receiving apparatus 300, via the clock communication path 103 (step S111). The pulse-driven heralded single-photon source 201 is driven in synchronization with the clock signal received by the clock signal receiving unit 209, and generates the photon pair by the parametric down conversion and the like (step S112). Then, it outputs one photon of the photon pair as the quantum signal, and outputs the other photon of the photon pair as the heralding signal. The timing adjuster 202 outputs as a first trigger signal, a heralding signal indicating a presence of the quantum signal output from the pulse-driven heralded single-photon source 201 on the quantum communication path 101 in synchronization with the clock signal received at the clock signal receiving unit 209 (step S113). The quantum signal modulating unit 203 implements a signal modulation to the quantum signal output from the pulse-driven heralded single-photon source 201, in timing with the first trigger signal output from the timing adjuster 202 (step S114), and transmits the quantum signal to which the signal modulation has been implemented via the quantum communication path 101 (step S115). The heralding signal transmitting unit 205 transmits the heralding signal output from the pulse-driven heralded single-photon source 201, via the heralding signal communication path 102 (step S116).

FIG. 9 is a flow chart illustrating the quantum communication method of the receiving side.

In the quantum encryption receiving apparatus 300, the clock signal transmitting unit 309 transmits the clock signal for pulse driving the single-photon source, via the clock communication path 103 (step S211). The heralding signal receiving unit 301 receives the heralding signal indicating the presence of the quantum signal output from the single-photon source on the quantum communication path 101, from the quantum encryption transmitting apparatus 200, via the heralding signal communication path 102 (step S212). The timing adjuster 303 outputs as the second trigger signal, the heralding signal received at the heralding signal receiving unit 301 in synchronization with the clock signal (step S213). The quantum signal demodulator 305 included in the quantum signal detecting unit 304 implements the signal demodulation to the quantum signal which is present on the quantum communication path 101, in timing with the second trigger signal output from the timing adjuster 303 (step S214). The quantum signal detecting unit 304 detects the quantum signal to which the signal demodulation has been implemented by the quantum signal demodulator 305, in timing with the second trigger signal output from the timing adjuster 303 (step S215).

As described above, by using the quantum communication apparatus of the present embodiment, a stable and highly-efficient quantum communication can be realized without being influenced by the jitter of the heralding signal. Moreover, a supply source of the clock signal used for that purpose can be installed somewhere other than the quantum communication apparatus of the transmitting side.

Third Embodiment

The present embodiment, mainly differences from the first embodiment, will be described.

The first embodiment employs the configuration in which, in the quantum signal detecting unit 304 of the quantum encryption receiving apparatus 300, the quantum signal demodulator 305 is used, and the measurement means of the quantum state of the photon transmitted from the quantum encryption transmitting apparatus 200 is selected actively. The present embodiment employs a configuration in which, instead of using the quantum signal demodulator 305, the photon detectors 306 used for the measurement are increased, and the measurement means of the quantum state is selected passively.

FIG. 10 is a block diagram showing a configuration of the quantum communication system 100 of the present embodiment.

The main difference from FIG. 1 described in the first embodiment resides in that the quantum signal detecting unit 304 of the quantum encryption receiving apparatus 300 includes a beam splitter 310 in place of the quantum signal demodulator 305.

In the quantum encryption receiving apparatus 300, the beam splitter 310 passively and randomly selects an optical path of the photon which is transferred from the quantum encryption transmitting apparatus 200, via the quantum communication path 101. The photon detector 306 detects a photon on the optical path selected by the beam splitter 310. Since the quantum signal detecting unit 304 does not include the quantum signal demodulator 305, the timing adjuster 303 need give a second trigger signal only to the photon detector 306.

FIG. 11 is a drawing showing one example of the quantum encryption optical system that passively selects a measurement means at the receiving side. For simplicity, the control system is omitted in FIG. 11. FIG. 11 illustrates one example of a configuration of the quantum signal modulating unit 203 and the quantum signal detecting unit 304, especially.

In the quantum encryption transmitting apparatus 200, the quantum state is actively specified and transmitted by using the phase modulator 208. However, in the quantum encryption receiving apparatus 300, the optical path is passively and randomly selected at the beam splitter 310. In their respective optical paths, there are non-symmetrical Mach-Zehnder interferometers 308a and 308b corresponding to previously set and fixed measurement means, and they lead to the photon detectors 306a to 306d corresponding to the respective measurement means. In this example, also in the quantum signal modulating unit 203 of the quantum encryption transmitting apparatus 200, in order to perform a signal modulation process, the non-symmetrical Mach-Zehnder interferometer 207 is used before the phase modulator 208. Moreover, in this example, the phase modulator 208 is used as one example of the quantum signal modulator 204, but the polarization modulator and the like may be used instead. Further, in this example, in the quantum signal detecting unit 304 of the quantum encryption receiving apparatus 300, the beam splitter 310 is used as one example of a quantum signal diverging unit.

For example, in case of performing the quantum encryption communication of a certain 2-bit information, in the quantum encryption transmitting apparatus 200, the input device which is not illustrated inputs the 2-bit information to the processing device which is not illustrated. Alternatively, the storage device which is not illustrated may store this 2-bit information, and the processing device may read this 2-bit information from the storage device. The processing device converts the 2-bit information into the electric signal, and inputs it to the quantum signal modulating unit 203. The quantum signal modulating unit 203 implements the signal modulation to one photon of the photon pair output from the pulse-driven heralded single-photon source 201, based on the electric signal input from the processing device, by using the non-symmetrical Mach-Zehnder interferometer 207 and the phase demodulator 208. Specifically, the phase demodulator 208 performs the phase modulation of the photon at four kinds of phase differences $\{0, \pi/2, \pi, (3/2)\pi\}$. In this way, 2-bit signal modulation is implemented to that photon. The photon to which such a signal modulation has been implemented is transferred from the quantum encryption transmitting apparatus 200 to the quantum encryption receiving apparatus 300, via the quantum communication path 101.

In the quantum encryption receiving apparatus 300, the quantum signal detecting unit 304 diverges the optical path of the photon transferred through the quantum communication path 101 into two optical paths by the beam splitter 310. In this example, the beam splitter 310 is a 50-50 nonpolarization beam splitter. One of the optical paths diverged by this beam splitter 310 is connected with the photon detector 306a and the photon detector 306b via the non-symmetrical Mach-Zehnder interferometer 308a. The other one of the optical paths is connected with the photon detector 306c and the photon detector 306d via the non-symmetrical Mach-Zehnder interferometer 308a. The quantum signal detecting unit 304 specifies values of two bits of the 2-bit information, depending on which of the photon detectors 306a to 306d has detected the photon transferred through the quantum communication path 101. One bit of the two bits specified here becomes valid if an optical path corresponding to a value of the remaining one bit and an optical path selected at the beam splitter 310 coincides. For example, the non-symmetrical Mach-Zehnder interferometer 308a may be set up to output a photon having a phase difference of 0 or $\pi$, and the non-symmetrical Mach-Zehnder interferometer 308b may be set up to output a photon having a phase difference of $\pi/2$ or $(3/2)\pi$. Moreover, the photon detector 306a may detect a photon having a phase difference of 0, the photon detector 306b may detect a photon having a phase difference of $\pi$, the photon detector 306c may detect a photon having a phase difference of $\pi/2$, and the photon detector 306d may detect a photon having a phase difference of $(3/2)\pi$. In this case, when the phase difference of the photon transferred through the quantum communication path 101 is either 0 or $\pi$, and the beam splitter 310 selects an optical path to which the non-symmetrical Mach-Zehnder interferometer 308a is connected, a bit specified by the quantum signal detecting unit 304 becomes valid. On the other hand, when the phase difference of the photon transferred through the quantum communication path 101 is either $\pi/2$ or $(3/2)\pi$, and the beam splitter 310 selects an optical path to which the non-symmetrical Mach-Zehnder interferometer 308b is connected, a bit specified by the quantum signal detecting unit 304 becomes valid. The output device which is not illustrated outputs the bit specified by the quantum signal detecting unit 304. The processing device which is not illustrated may carry out a predetermined processing by using this bit. This bit, for example, can be utilized as key information or a part of key information.

FIG. 12 is a timing chart illustrating one example of the quantum encryption communication of the present embodiment. FIG. 12 is similar to FIG. 3 described in the first embodiment, except that the second trigger signal ("quantum signal demodulation trigger signal") for operating the quantum signal demodulator 305 at the receiving side is not needed.

FIG. 13 is a flow chart illustrating the quantum communication method of the receiving side. The quantum communication method of the transmitting side is similar to that shown in FIG. 5 of the first embodiment.

In the quantum encryption receiving apparatus 300, the heralding signal receiving unit 301 receives the heralding signal indicating the presence of the quantum signal output from the single-photon source on the quantum communication path 101, from the quantum encryption transmitting apparatus 200, via the heralding signal communication path 102 (step S221). The clock signal receiving unit 302 receives the clock signal for pulse driving the single-photon source, from the quantum encryption transmitting apparatus 200, via the clock communication path 103 (step S222). The timing adjuster 303 outputs as the second trigger signal, the heralding signal received at the heralding signal receiving unit 301 in synchronization with the clock signal received at the clock signal receiving unit 302 (step S223). A beam splitter 310 included in the quantum signal detecting unit 304 diverges the quantum communication path 101 (step S224). The quantum signal detecting unit 304 detects the quantum signal which is present on the quantum communication path 101 diverged by the beam splitter 310, in timing with the second trigger signal output from the timing adjuster 303 (step S225).

As described above, by using the quantum communication apparatus of the present embodiment, a stable and highly-efficient quantum communication can be realized without being influenced by the jitter of the heralding signal. Moreover, as for the quantum communication apparatus of the receiving side, since it employs the configuration that does not use the quantum signal demodulator, the trigger signal given to the quantum signal demodulator is not needed, and a control becomes relatively easy.

Fourth Embodiment

The present embodiment, mainly differences from the third embodiment, will be described.

In the third embodiment, similar to the first embodiment, in regard to the quantum communication system 100, the clock signal which synchronizes the heralding signal for generating the trigger signal is transmitted from the quantum encryption transmitting apparatus 200 to the quantum encryption receiving apparatus 300. In the present embodiment, similar to the second embodiment, it is transmitted from the quantum encryption receiving apparatus 300 to the quantum encryption transmitting apparatus 200.

FIG. 14 is a block diagram showing a configuration of the quantum communication system 100 of the present embodiment.

The main difference from FIG. 10 of the third embodiment resides in that the quantum encryption transmitting apparatus 200 includes the clock signal receiving unit 209 in place of the clock signal transmitting unit 206, and that the quantum encryption receiving apparatus 300 includes a clock signal transmitting unit 309 in place of the clock signal receiving unit 302. Function of the clock signal transmitting unit 309 and the clock signal receiving unit 209 is similar to that illustrated in FIG. 7 of the second embodiment.

FIG. 15 is a flow chart illustrating a quantum communication method of the receiving side. The quantum communication method of the transmitting side is similar to that illustrated in FIG. 8 of the second embodiment.

In the quantum encryption receiving apparatus 300, the clock signal transmitting unit 309 transmits the clock signal for pulse driving the single-photon source, via the clock communication path 103 (step S231). The heralding signal receiving unit 301 receives the heralding signal indicating the presence of the quantum signal output from the single-photon source on the quantum communication path 101, from the quantum encryption transmitting apparatus 200, via the heralding signal communication path 102 (step S232). The timing adjuster 303 outputs as the second trigger signal, the heralding signal received by the heralding signal receiving unit 301 in synchronization with the clock signal (step S233). The beam splitter 310 included in the quantum signal detecting unit 304 diverges the quantum communication path 101 (step S234). The quantum signal detecting unit 304 detects the quantum signal present on the quantum communication path 101 which is diverged by the beam splitter 310, in timing with the second trigger signal output from the timing adjuster 303 (step S235).

As described above, by using the quantum communication apparatus of the present embodiment, without being influenced by the jitter of the heralding signal, a stable and highly-efficient quantum communication can be realized. Moreover, a supply source of the clock signal used for that purpose can be installed somewhere other than the quantum communication apparatus of the transmitting side.

Fifth Embodiment

The present embodiment, mainly differences from the first embodiment, will be described.

In the first embodiment, in the quantum encryption transmitting apparatus 200, the heralding signal output from the pulse-driven heralded single-photon source 201 is used as it is, as the heralding signal. In the present embodiment, the heralding signal output from the pulse-driven heralded single-photon source 201 and the pulse clock signal output from the same are input into an AND operation gate, and a signal output from the gate is used as the heralding signal.

FIG. 16 is a block diagram showing a configuration of the quantum communication system 100 of the present embodiment.

The main difference from FIG. 1 of the first embodiment resides in that the quantum encryption transmitting unit 200 includes not only the pulse-driven heralded single-photon source 201 but also an AND gate 210 (a logical AND operation gate) as the signal generating unit. In the present embodiment, the signal generating unit generates the photon pair with the pulse-driven heralded single-photon source 201, and outputs one photon of the photon pair as the quantum signal. The signal generating unit also performs a logical AND operation of the other photon of the photon pair (i.e., the heralding signal) and the clock signal with the AND gate 210, and outputs a result of the logical AND operation as a new heralding signal.

For example, in the pulse-driven heralded single-photon source 201, at a time of converting the heralding signal from a light into an electric signal, an error may occur to the heralding signal. In the present embodiment, the AND gate 210 performs the logical AND operation of the heralding signal and the pulse clock signal, and its result is set as a heralding signal once again. In this way, an influence due to the error of such heralding signal can be restricted to a timing of the pulse clock signal. That is, by using the quantum communication apparatus of the present embodiment, the influence due to the error of the heralding signal can be reduced. As a result, S/N ratio (signal-to-noise ratio) becomes high.

The differences between the first embodiment and the present embodiment can also be applied to the second to fourth embodiments. That is, in the second to fourth embodiments, in the quantum encryption transmitting apparatus 200, the heralding signal output from the pulse-driven heralded single-photon source 201 is used as it is, as the heralding signal. However, in the second to fourth embodiments, similar to the present embodiment, the heralding signal output from the pulse-driven heralded single-photon source 201 and the clock signal output from the same (alternatively, received from the quantum encryption receiving apparatus 300) are input into the logical AND operation gate, and a signal output from the gate may be used as the heralding signal.

As described above, in the present embodiment, the logical AND operation of the heralding signal and the pulse clock signal output from the pulse-driven heralded single-photon source 201 is performed by using the AND gate 210, so that the heralding signal is output (from the signal generating unit) only at a rising edge of the pulse clock signal. In doing so, as described above, the influence due to the error of the heralding signal can be restricted to the timing of the pulse clock signal. In order to output the heralding signal only at the rising edge of the pulse clock signal, the signal generating unit may perform the logical AND operation of the heralding signal and the pulse clock signal by using a means other than the AND gate 210, and output a result of the AND operation as a heralding signal once again. Moreover, the signal generating unit may use a method other than the logical AND operation (e.g., logical NOR operation, logical NAND operation, logical OR operation, or an arbitrary combination of these), to control the heralding signal with the pulse clock signal, and output a controlled heralding signal.

Multiple embodiments are described above, and, among them, two or more embodiments may be implemented in combination. Moreover, in any of the embodiments, each quantum communication apparatus may include both configurations of the transmitting side and the receiving side.

EXPLANATION OF SIGNS

Figure 1:
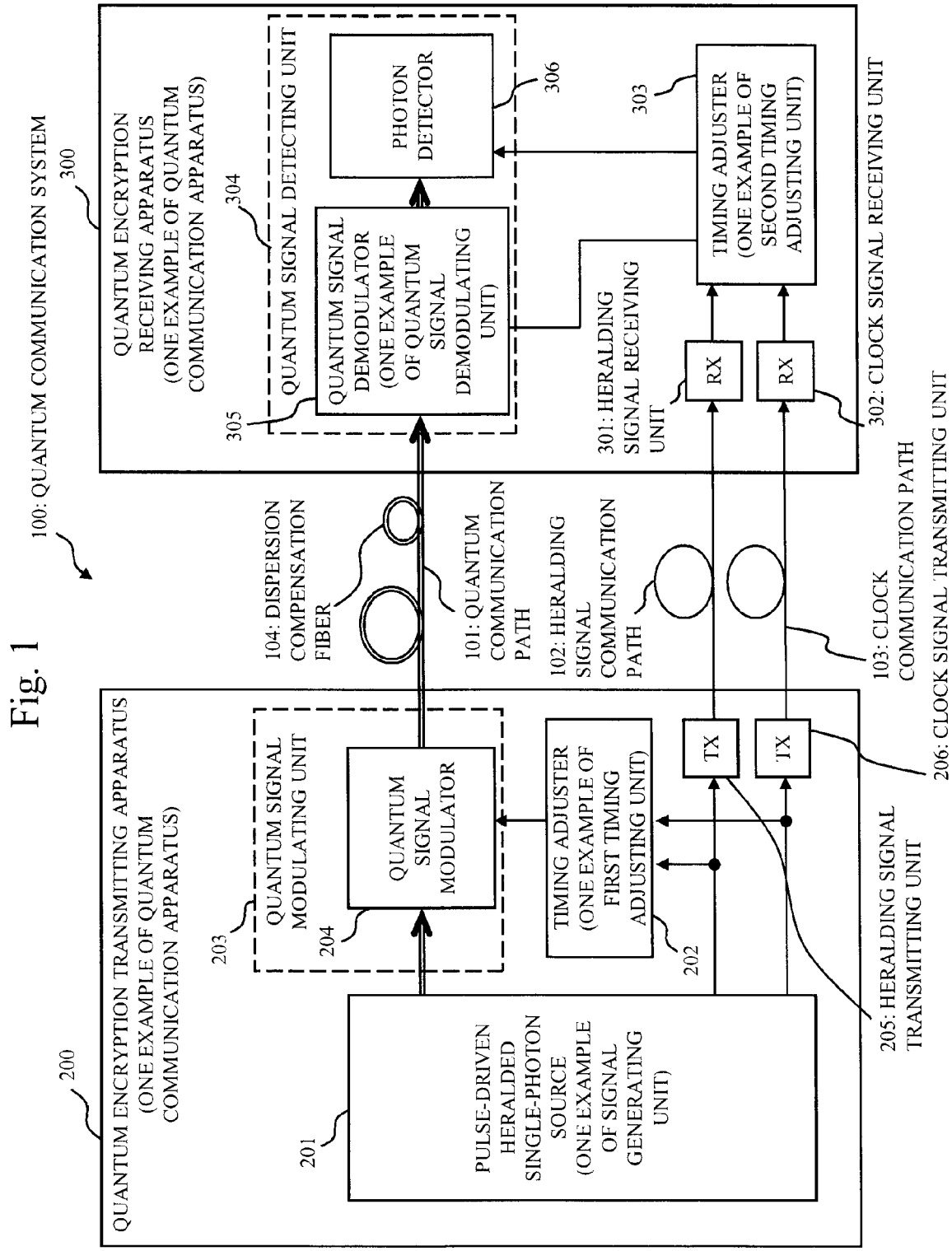
FIG. 1 A block diagram showing a configuration of the quantum communication system, in accordance with the first embodiment.
Figure 2:
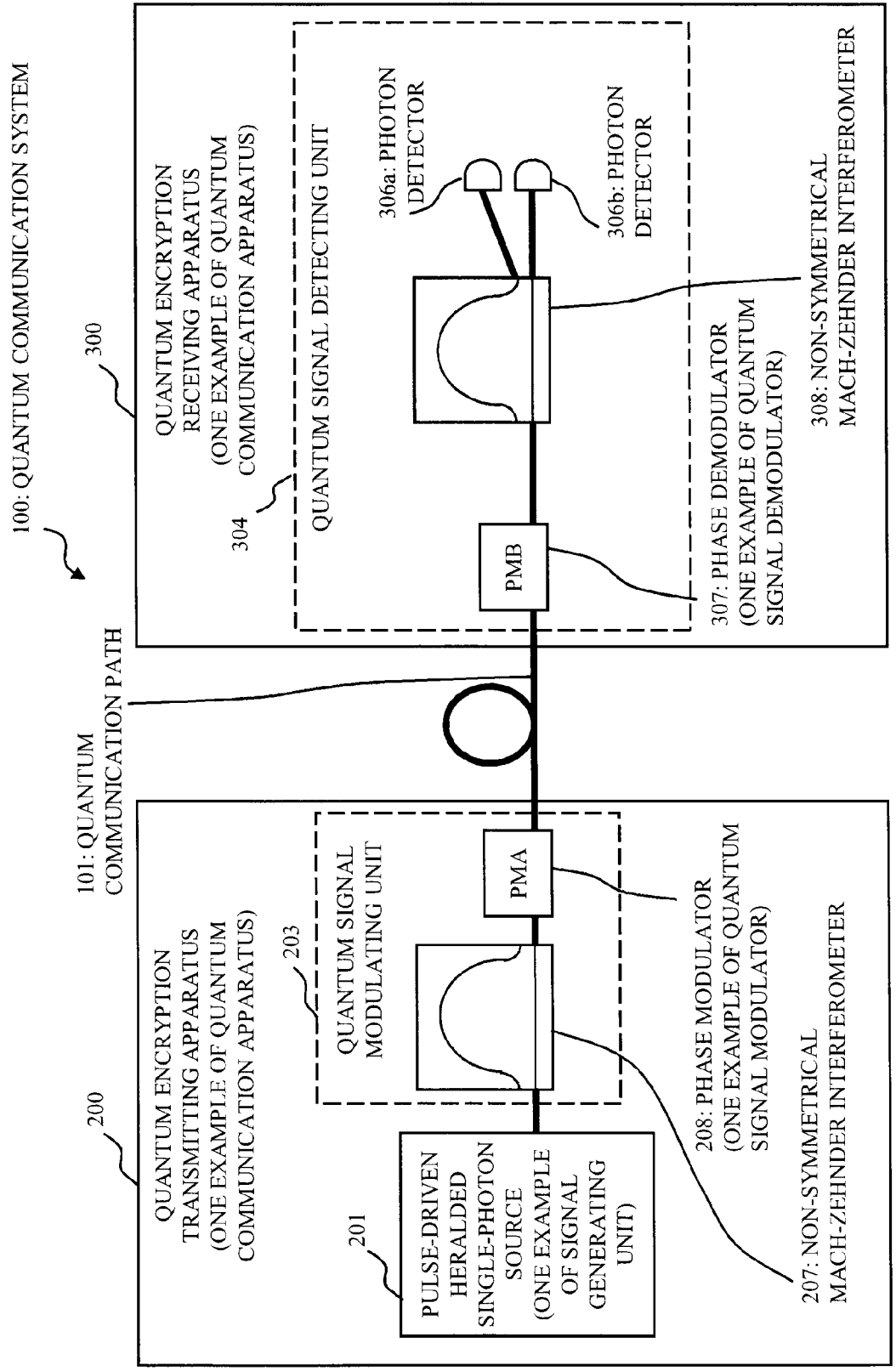
FIG. 2 A drawing showing one example of a configuration of the quantum signal modulating unit and the quantum signal detecting unit, in accordance with the first embodiment.
Figure 3:
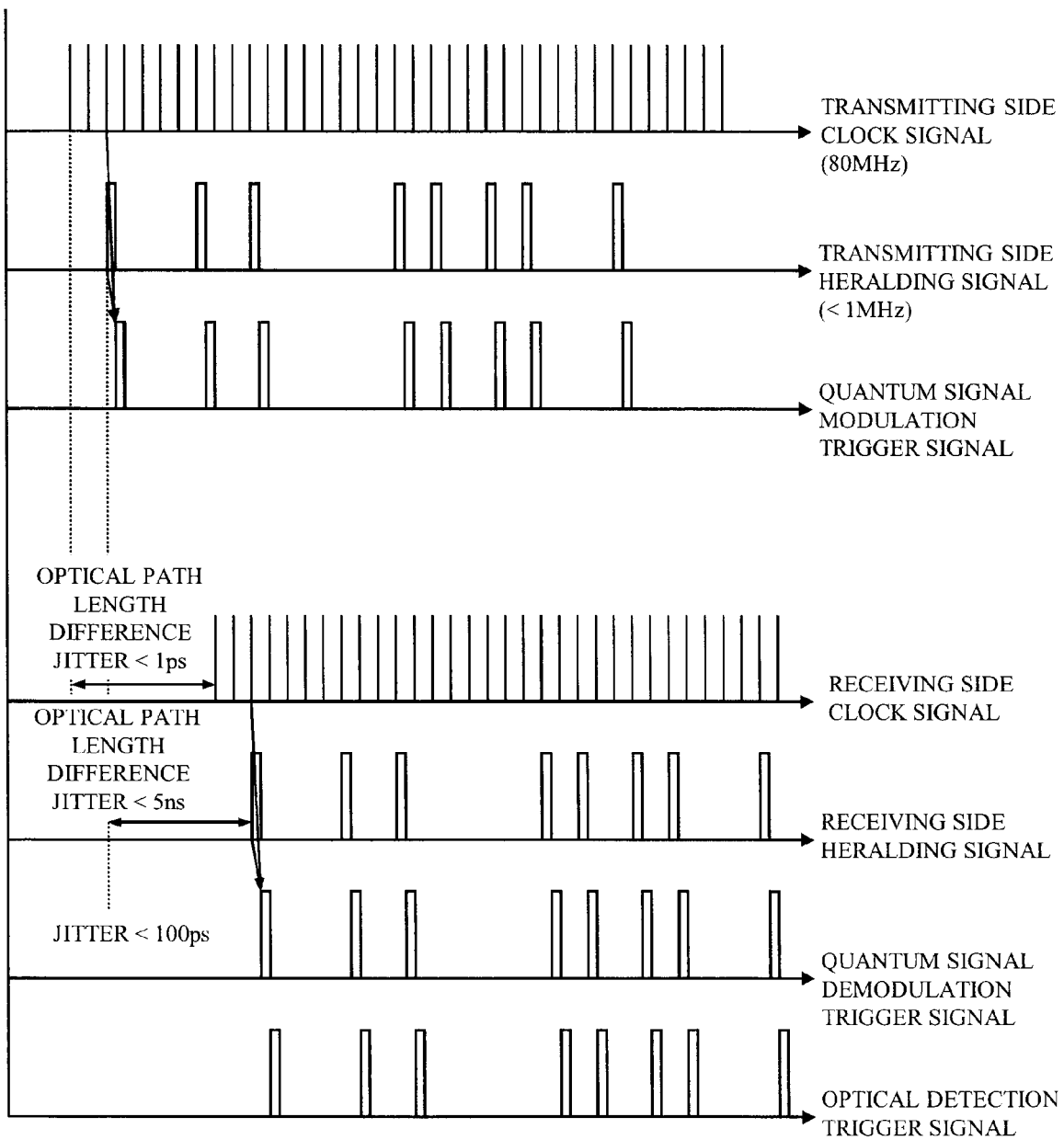
FIG. 3 A timing chart showing one example of the quantum encryption communication, in accordance with the first embodiment.
Figure 4:
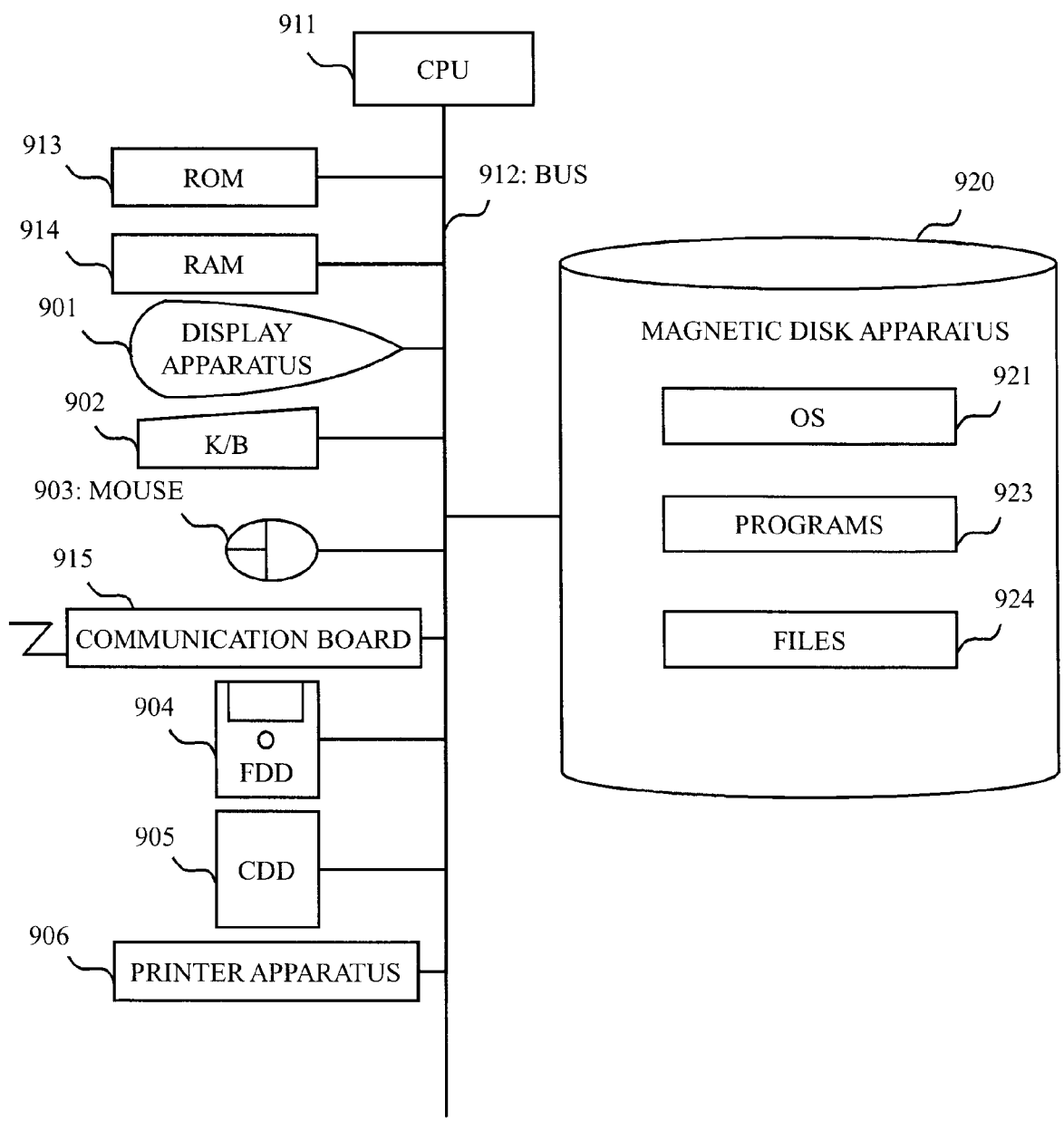
FIG. 4 A drawing showing one example of the hardware resource of the quantum communication apparatus, in accordance with the first embodiment.
Figure 5:
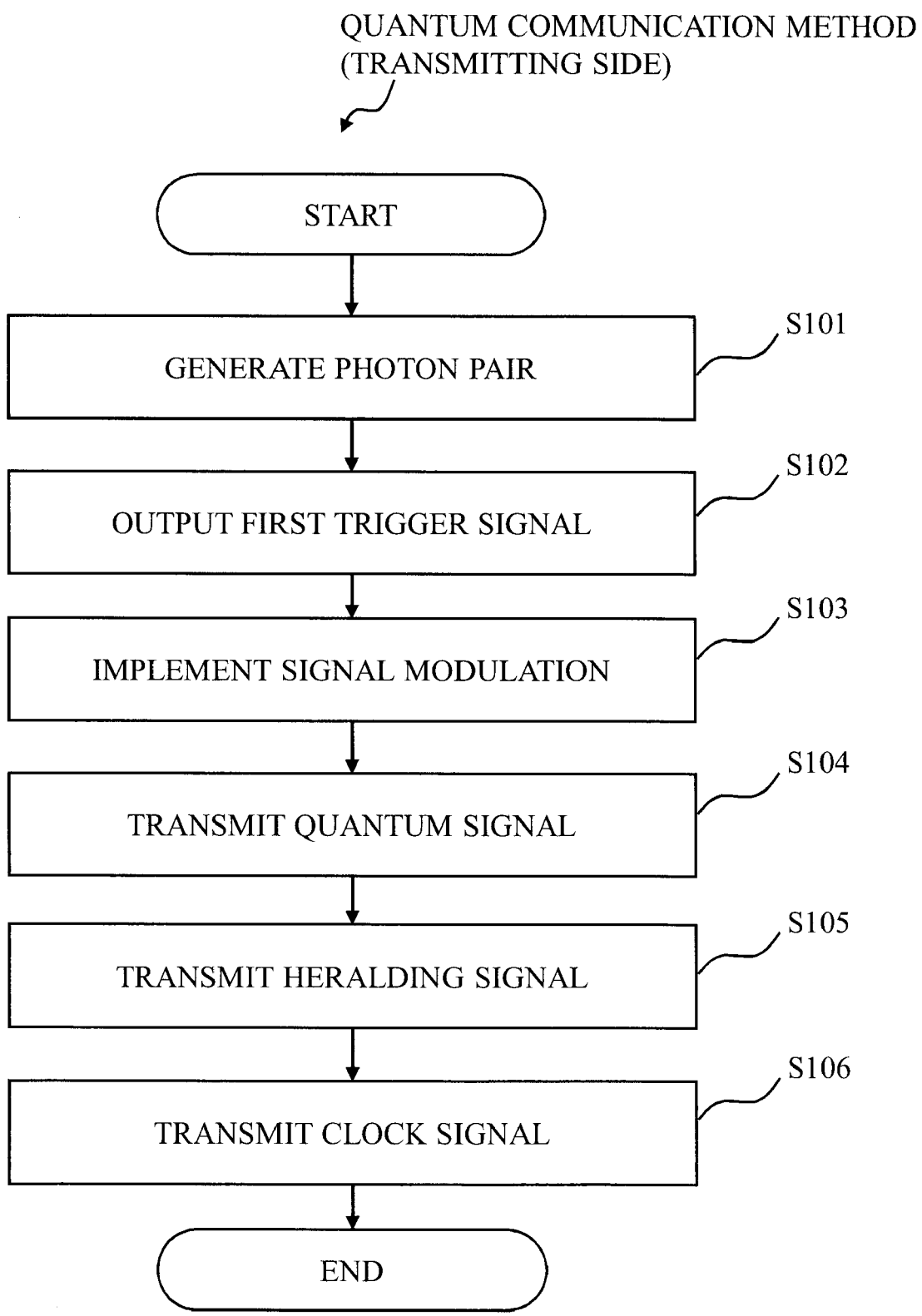
FIG. 5 A flow chart showing a quantum communication method (transmitting side), in accordance with the first embodiment.
Figure 6:
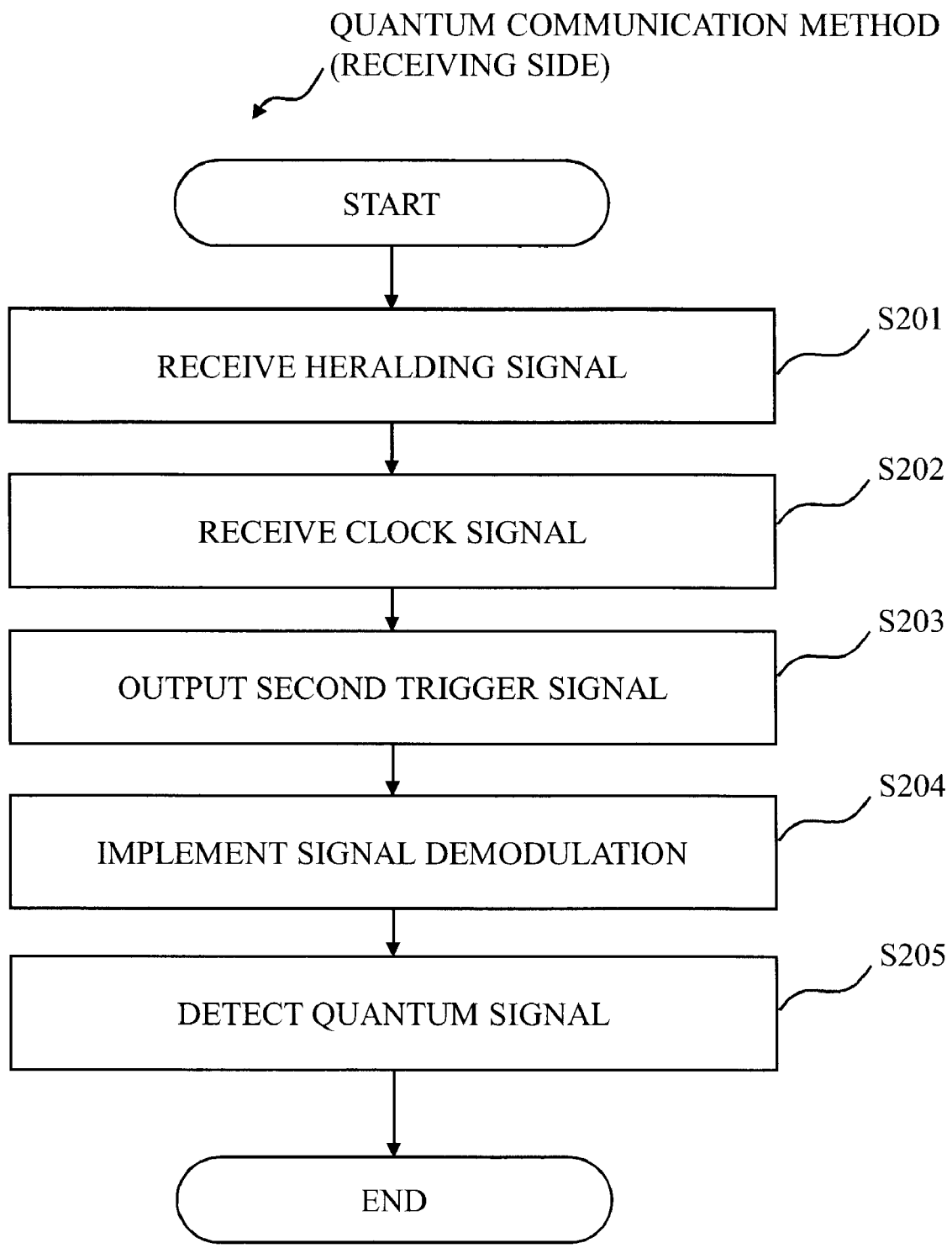
FIG. 6 A flow chart showing a quantum communication method (receiving side), in accordance with the first embodiment.
Figure 7:
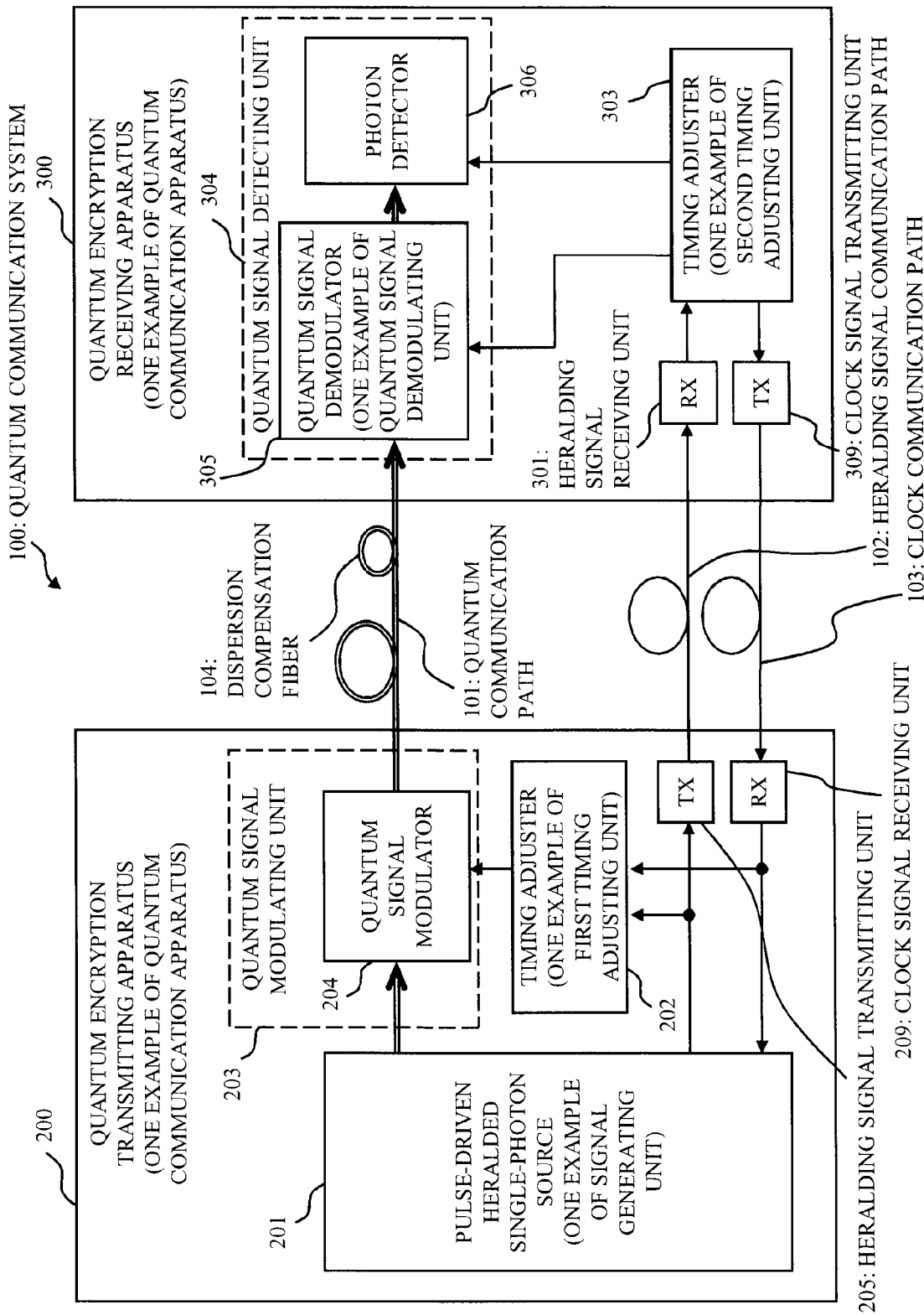
FIG. 7 A block diagram showing a configuration of the quantum communication system, in accordance with the second embodiment.
Figure 8:
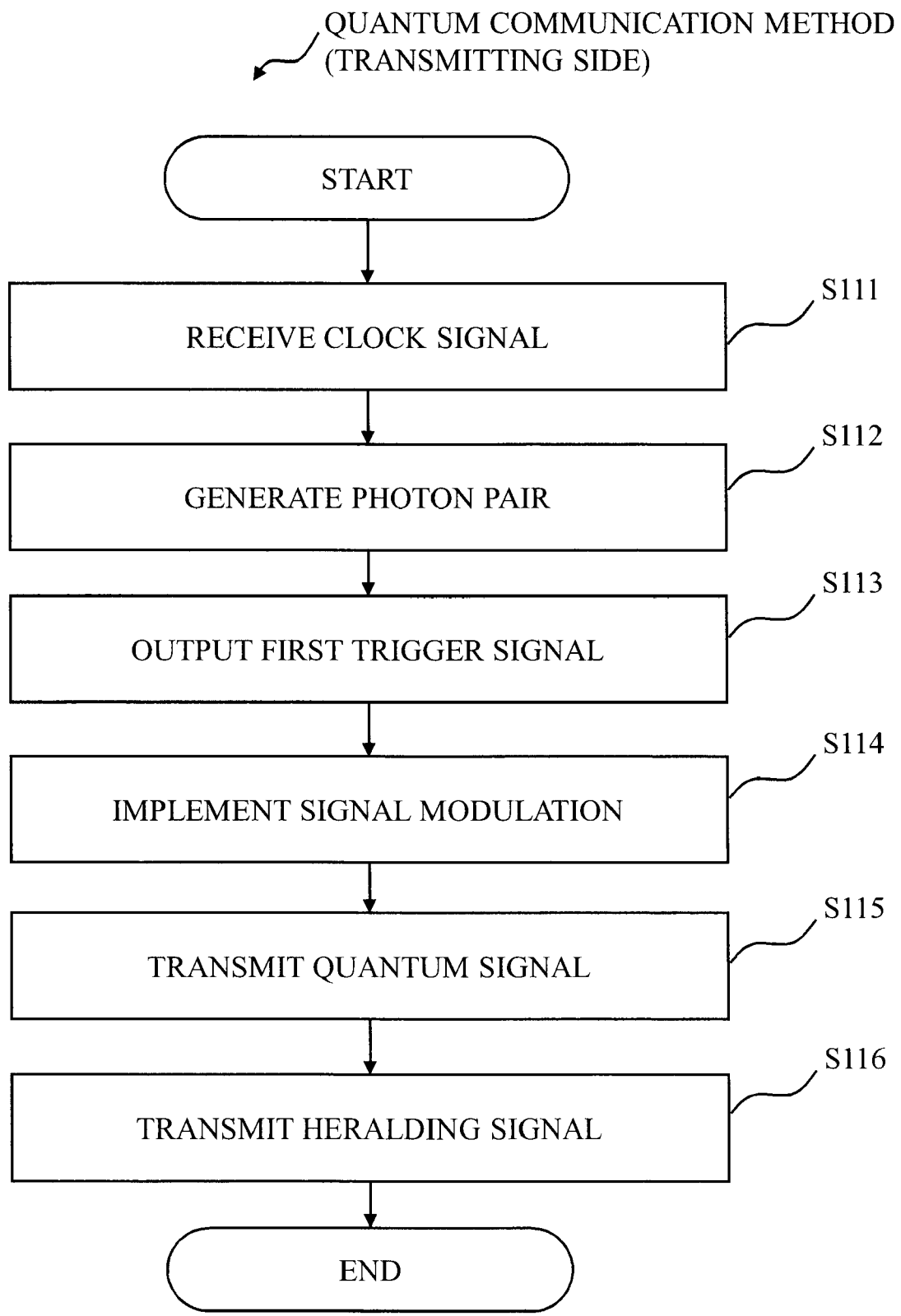
FIG. 8 A flow chart showing a quantum communication method (transmitting side), in accordance with the second embodiment.
Figure 9:
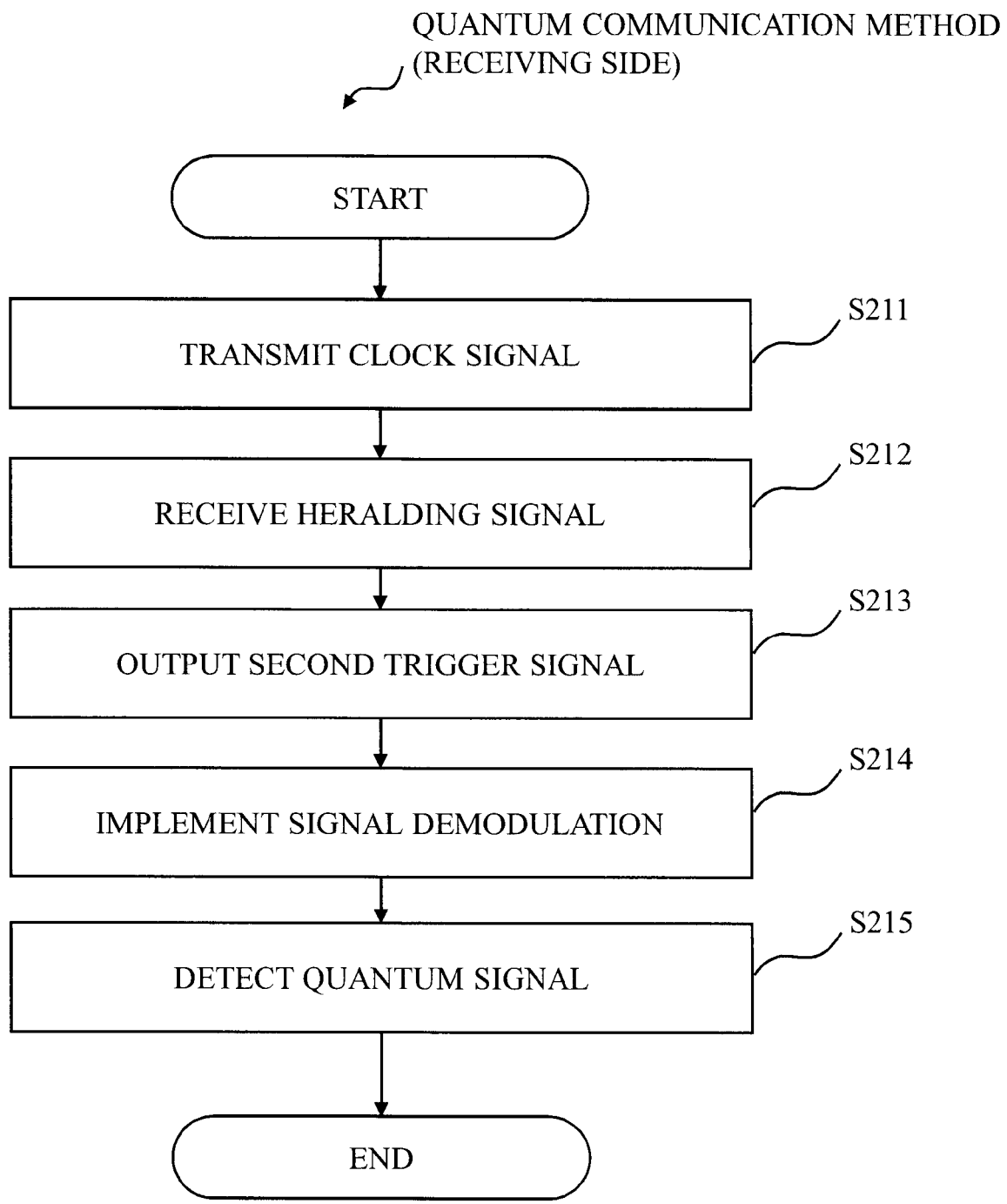
FIG. 9 A flow chart showing a quantum communication method (receiving side), in accordance with the second embodiment.
Figure 10:
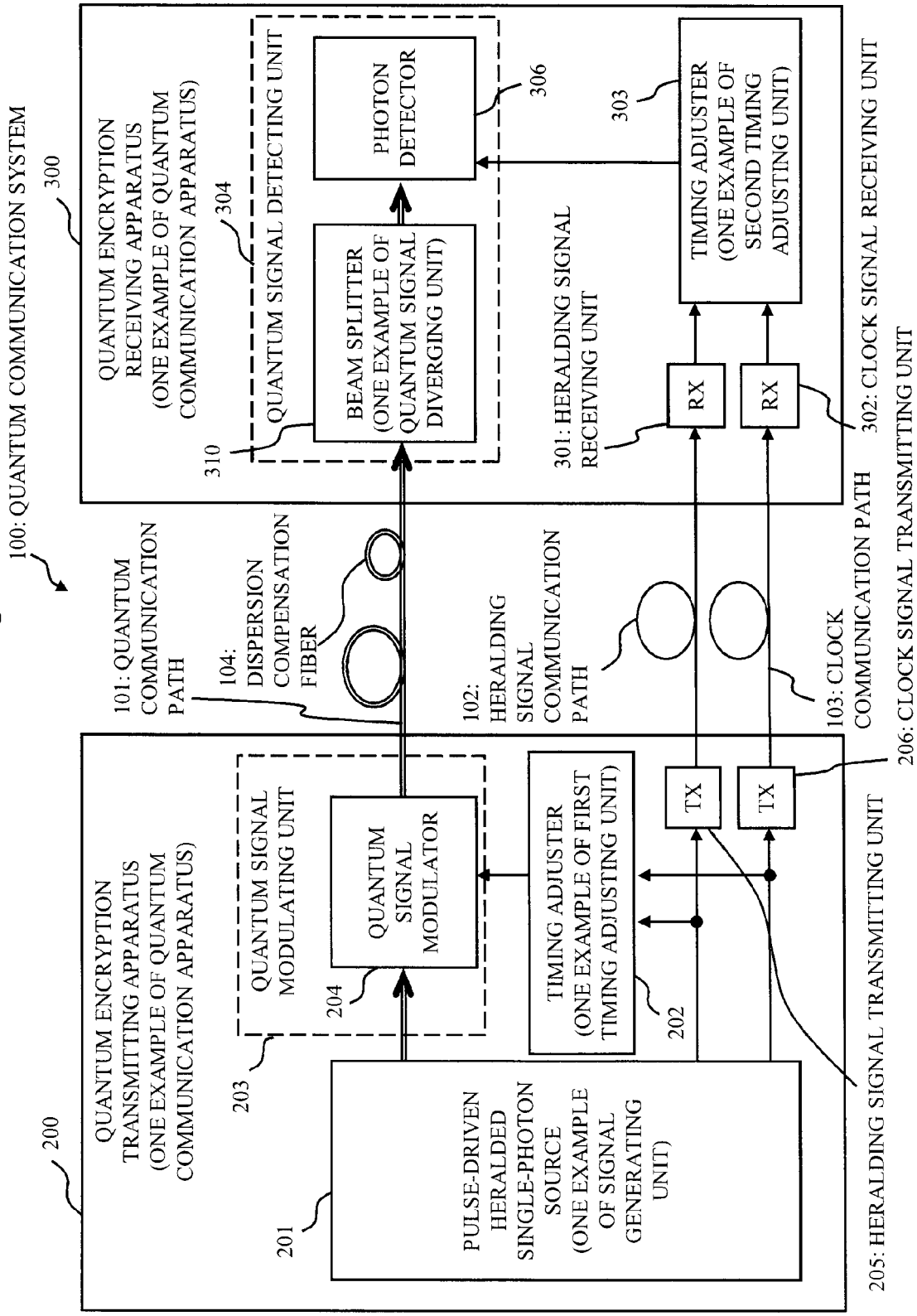
FIG. 10 A block diagram showing a configuration of the quantum communication system, in accordance with the third embodiment.
Figure 11:
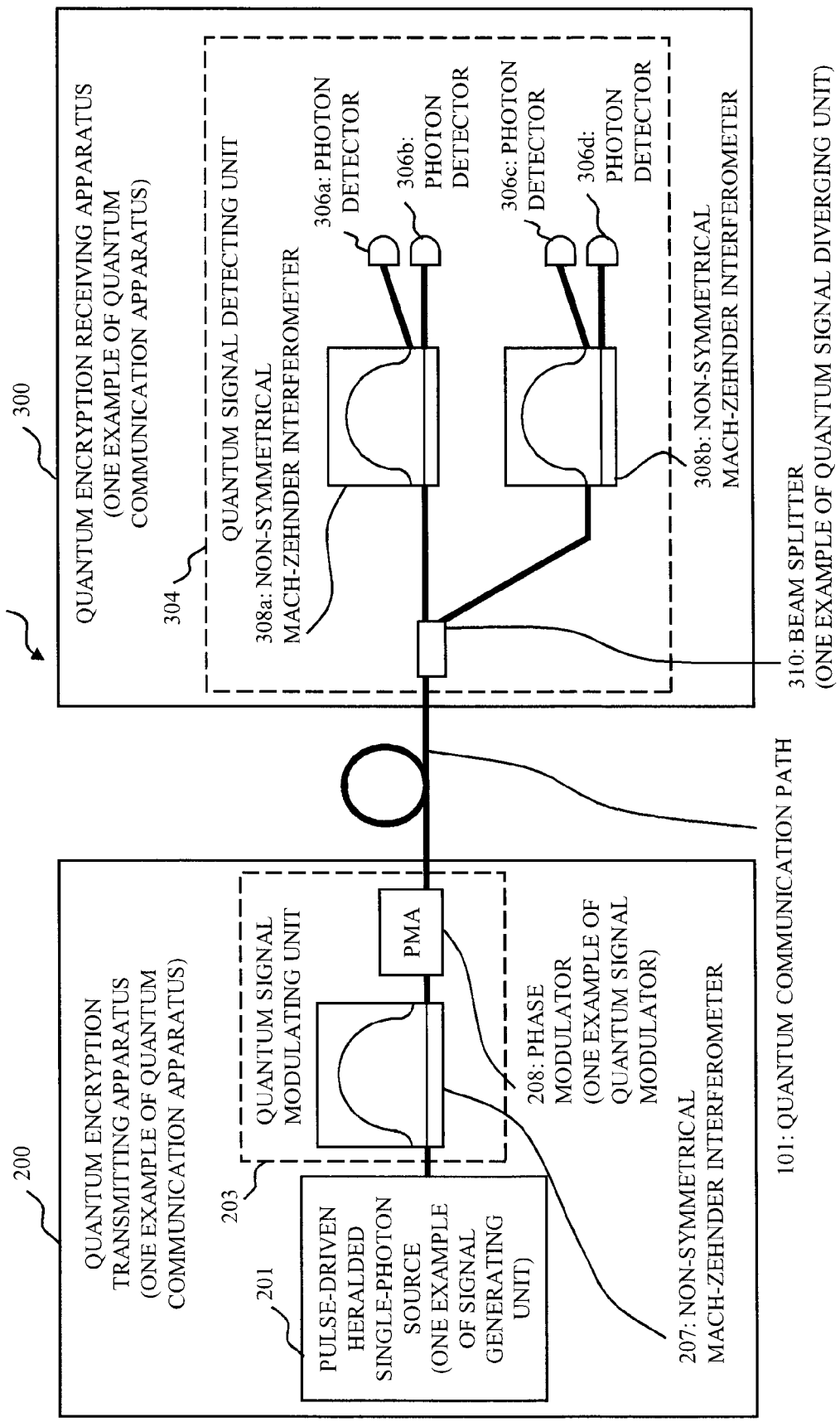
FIG. 11 A drawing showing one example of a configuration of the quantum signal modulating unit and the quantum signal detecting unit, in accordance with the third embodiment.
Figure 12:
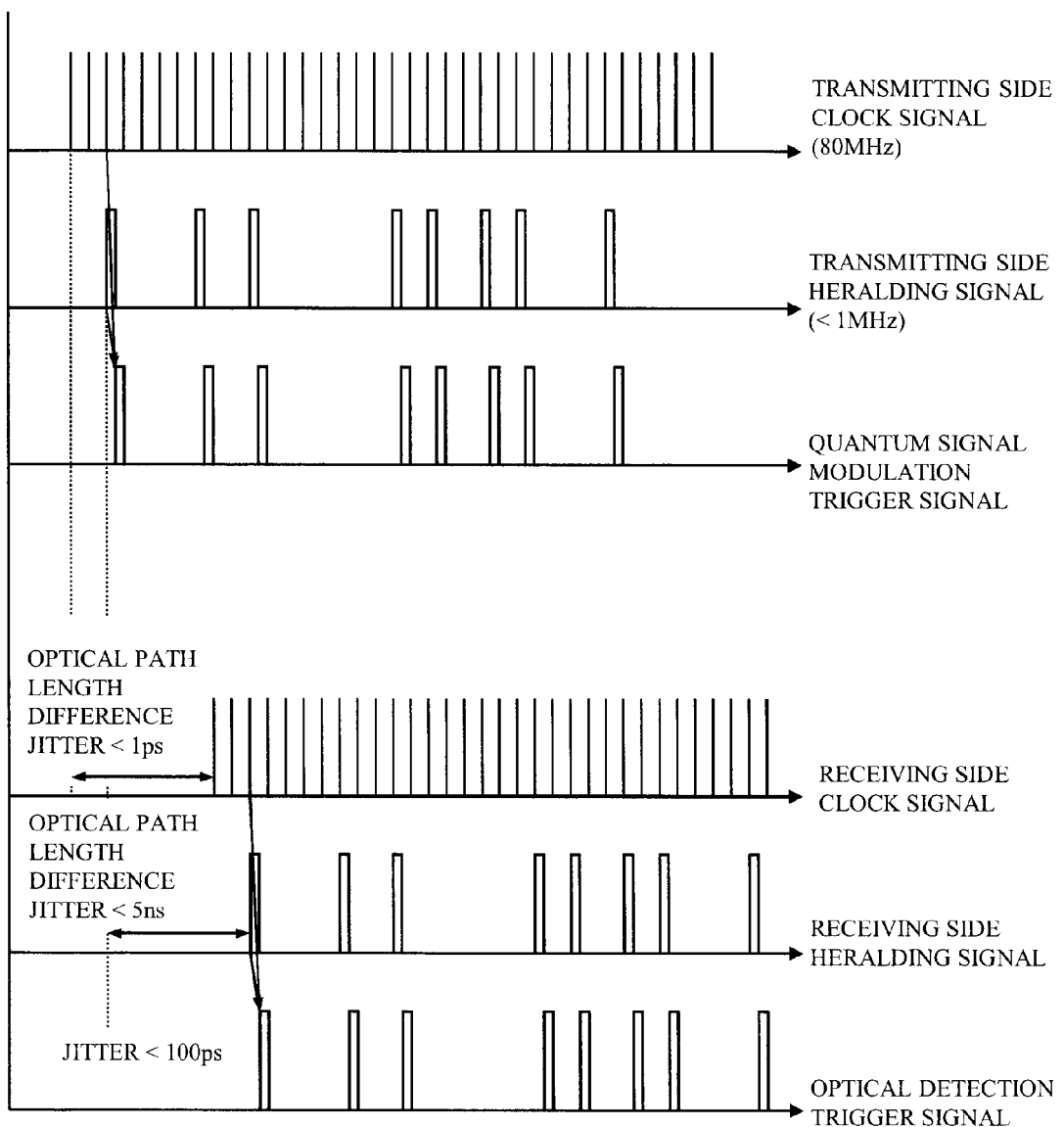
FIG. 12 A timing chart showing one example of the quantum encryption communication, in accordance with the third embodiment.
Figure 13:
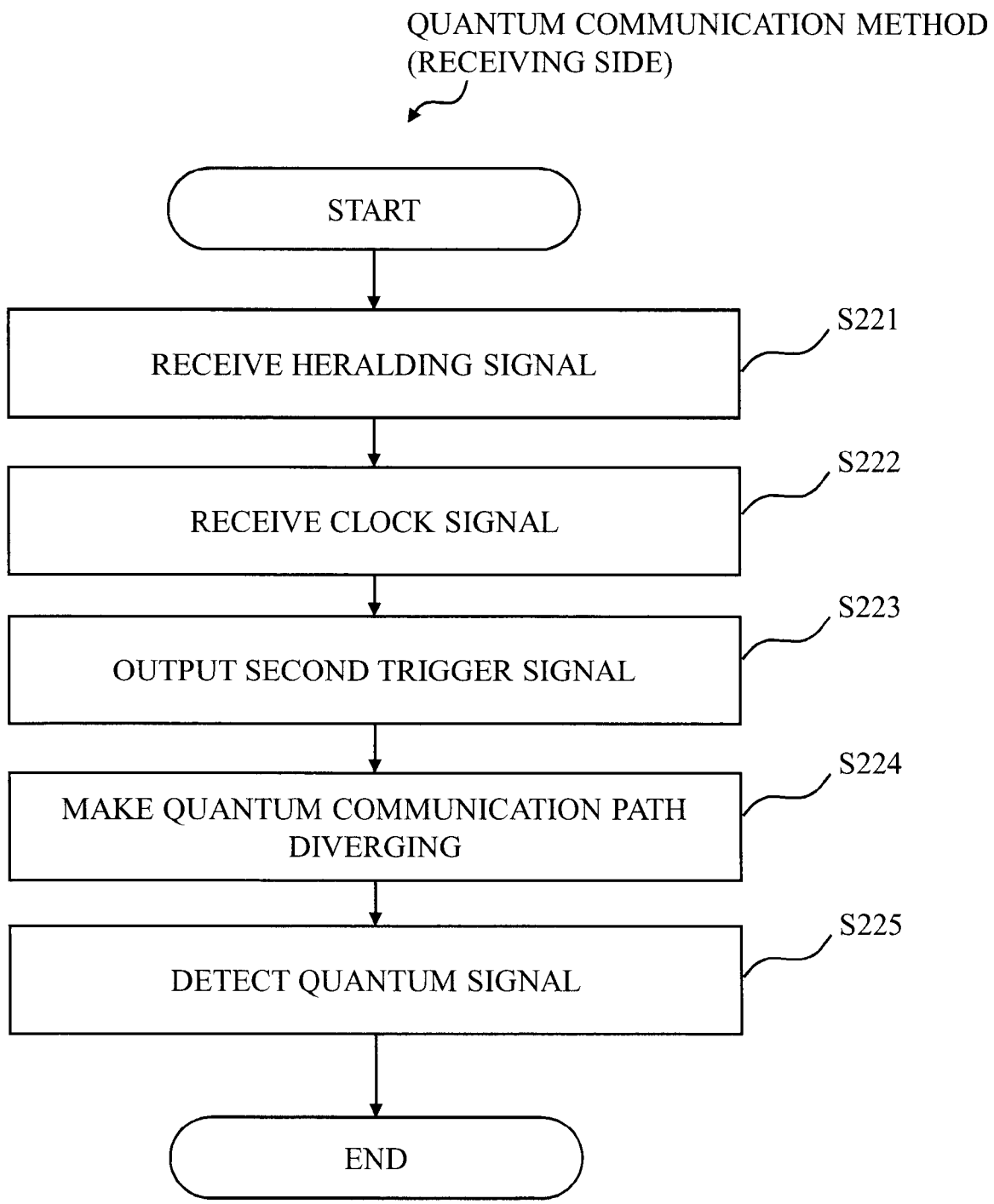
FIG. 13 A flow chart showing the quantum communication method (receiving side), in accordance with the third embodiment.
Figure 14:
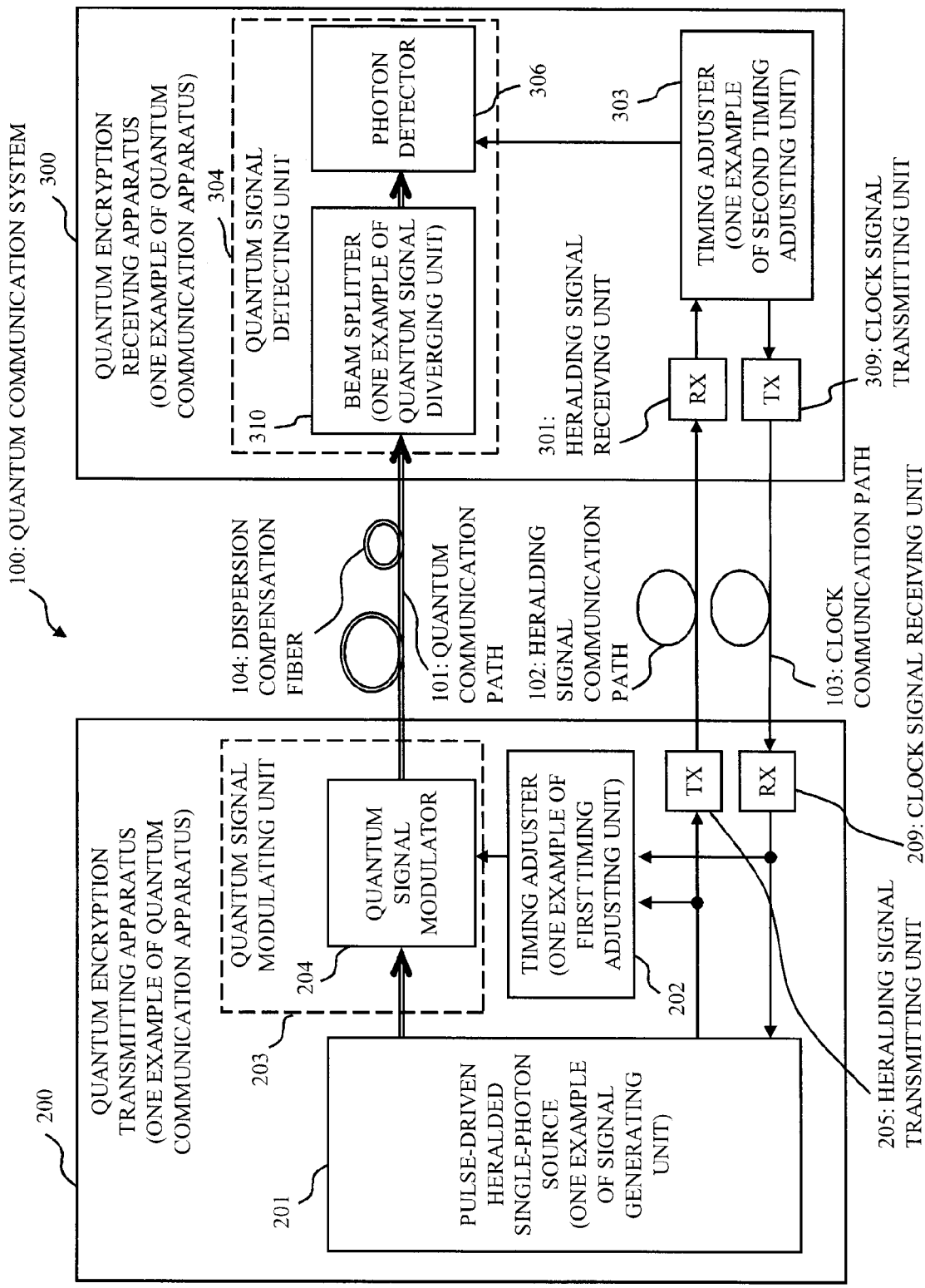
FIG. 14 A block diagram showing a configuration of the quantum communication system, in accordance with the fourth embodiment.
Figure 15:
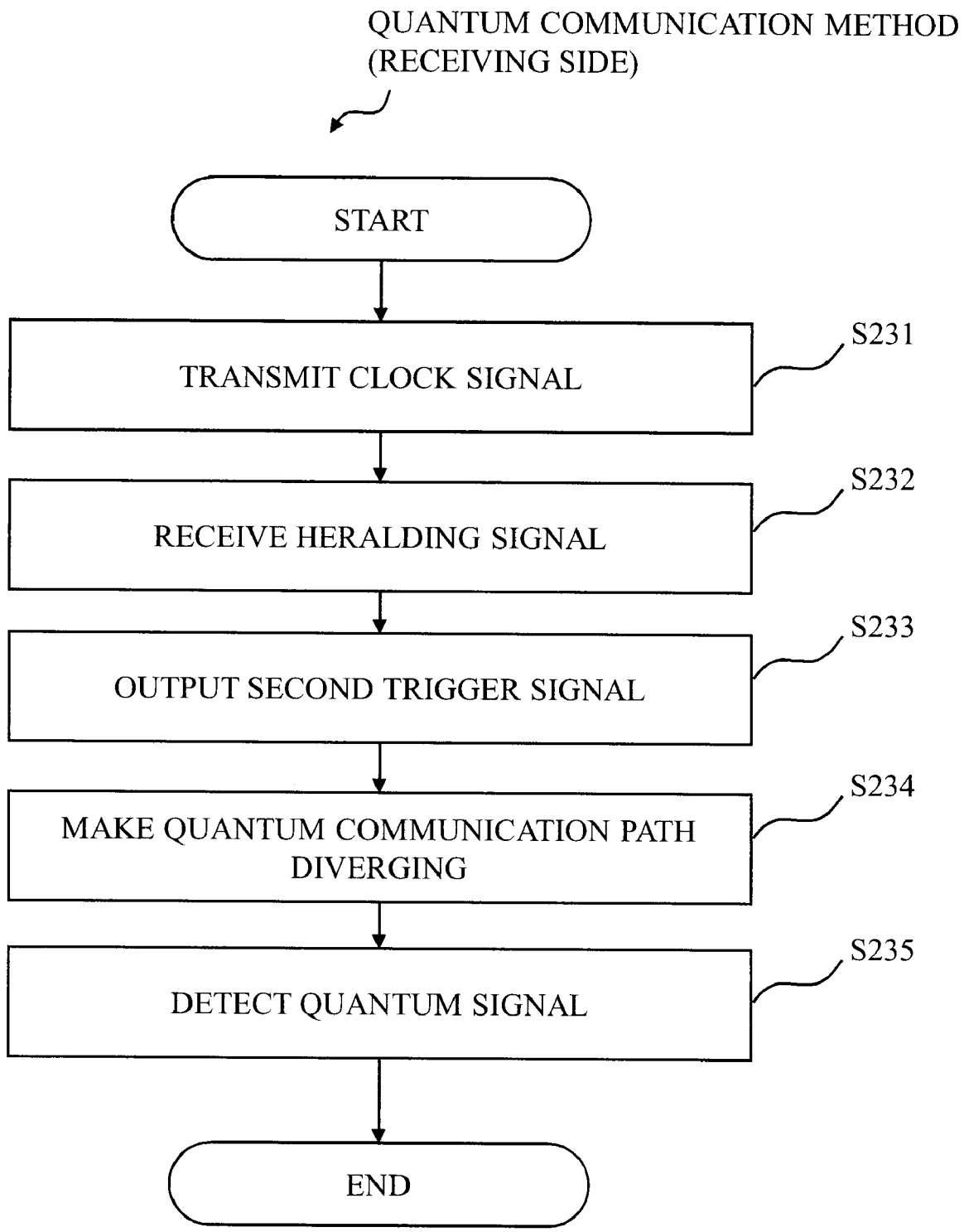
FIG. 15 A flow chart showing the quantum communication method (receiving side), in accordance with the fourth embodiment.
Figure 16:
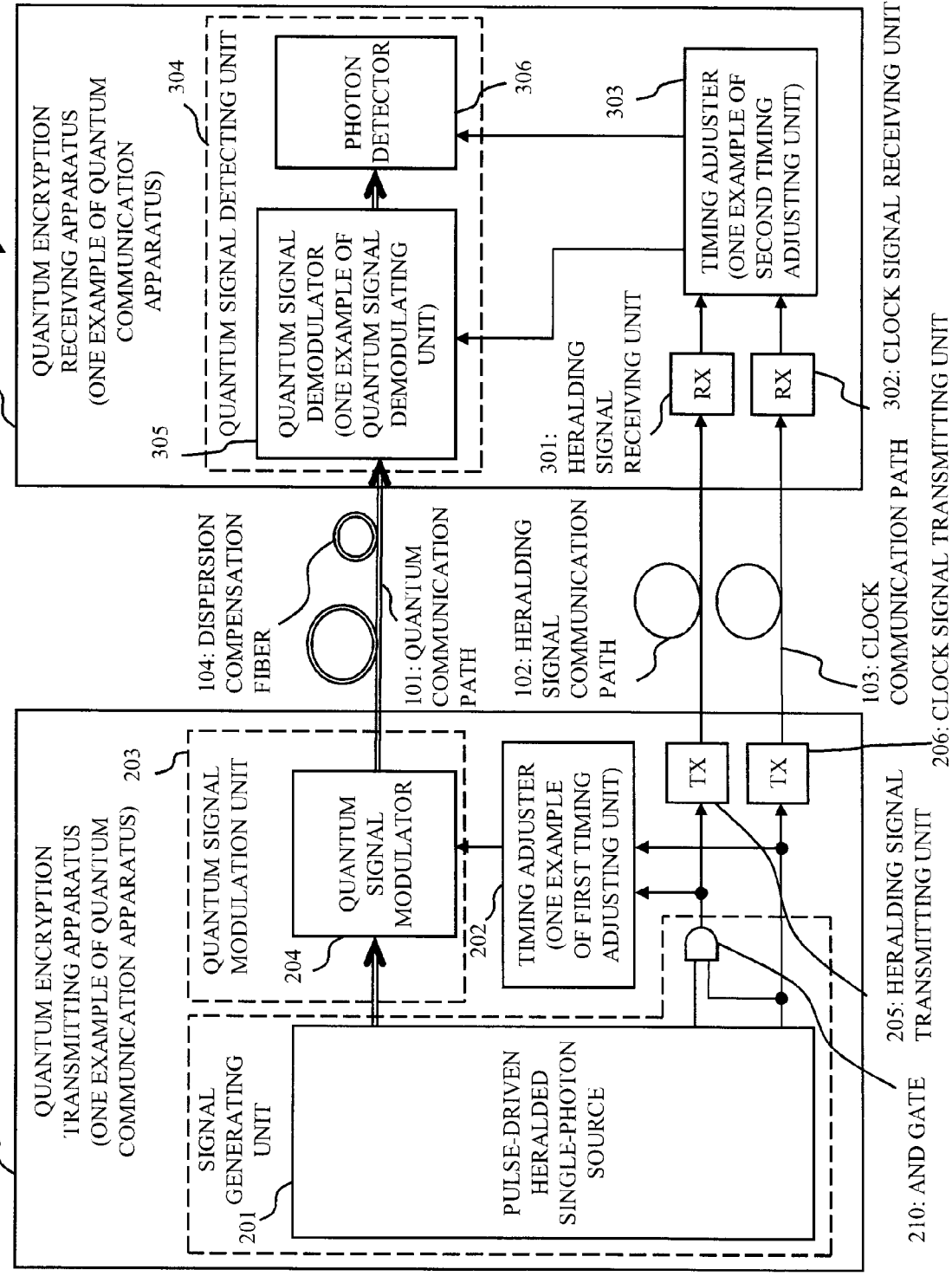
FIG. 16 A block diagram showing a configuration of the quantum communication system, in accordance with the fifth embodiment.

100: quantum communication system; 101: quantum communication path; 102: heralding signal communication path; 103: clock communication path; 104: dispersion compensation fiber; 200: quantum encryption transmitting apparatus; 201: pulse-driven heralded single-photon source; 202: timing adjuster; 203: quantum signal modulating unit; 204: quantum communication modulator; 205: heralding signal transmitting unit; 206: clock signal transmitting unit; 207: non-symmetrical Mach-Zehnder interferometer; 208: phase modulator; 209: clock signal receiving unit; 210: AND gate; 300: quantum encryption receiving apparatus; 301: heralding signal receiving unit; 302: clock signal receiving unit; 303: timing adjuster; 304: quantum signal detecting unit; 305: quantum signal demodulator; 306: photon detector; 307: phase modulator; 308: non-symmetrical Mach-Zehnder interferometer; 309: clock signal transmitting unit; 310: beam splitter; 901: display apparatus; 902: keyboard; 903: mouse; 904: FDD; 905: CDD; 906: printer apparatus; 911: CPU; 912: bus; 913: ROM; 914: RAM; 915: communication board; 920: magnetic disk apparatus; 921: operating system; 923: programs; 924: files.

The invention claimed is:

1. A quantum communication apparatus for transmitting a photon output as a quantum signal, from a single-photon source that outputs a photon by pulse driving, via a quantum communication path, comprising:
    a timing adjusting unit that outputs as a trigger signal, a heralding signal indicating a presence of the quantum signal output from the single-photon source on the quantum communication path, in synchronization with a clock signal for pulse driving the single-photon source;
    a quantum signal modulating unit that implements a signal modulation to the quantum signal, in timing with the trigger signal output from the timing adjusting unit, and transmits a quantum signal to which the signal modulation has been implemented, via the quantum communication path; and
    a heralding signal transmitting unit that transmits the heralding signal via a heralding signal communication path.

2. The quantum communication apparatus according to claim 1, further comprising:
    a clock signal transmitting unit that transmits the clock signal via a clock communication path.

3. The quantum communication apparatus according to claim 1, further comprising:
    a clock signal receiving unit that receives the clock signal via a clock communication path,
    wherein the timing adjusting unit outputs as the trigger signal, the heralding signal in synchronization with the clock signal received at the clock signal receiving unit.

4. The quantum communication apparatus according to claim 1, further comprising:
    a signal generating unit that generates a photon pair by the single-photon source, outputs one photon of the photon pair as the quantum signal, and outputs the other photon of the photon pair as the heralding signal,
    wherein the quantum signal modulating unit implements the signal modulation to the quantum signal output from the signal generating unit, and
    the heralding signal transmitting unit transmits the heralding signal output from the signal generating unit.

5. The quantum communication apparatus according to claim 4, wherein the signal generating unit generates the photon pair by a parametric down conversion.

6. The quantum communication apparatus according to claim 4, wherein the signal generating unit performs a logical AND operation of the heralding signal output from the single-photon source and the clock signal, and outputs a result of the logical AND operation once again as the heralding signal.

7. The quantum communication apparatus according to claim 4, wherein the signal generating unit controls the heralding signal output from the single-photon source by the clock signal, and outputs a heralding signal controlled.

8. A quantum communication apparatus for receiving a photon output as a quantum signal, from a single-photon source that outputs a photon by pulse driving, via a quantum communication path, comprising:
- a heralding signal receiving unit that receives a heralding signal indicating a presence of the quantum signal output from the single-photon source, via a heralding signal communication path;
- a timing adjusting unit that outputs as a trigger signal, the heralding signal received by the heralding signal receiving unit in synchronization with a clock signal for pulse driving the single-photon source; and
- a quantum signal detecting unit that detects the quantum signal present on the quantum communication path, in timing with the trigger signal output from the timing adjusting unit.

9. The quantum communication apparatus according to claim 8, further comprising:
- a clock signal receiving unit that receives the clock signal via a clock communication path,
- wherein the timing adjusting unit outputs as the trigger signal, the heralding signal received at the heralding signal receiving unit in synchronization with the clock signal received at the clock signal receiving unit.

10. The quantum communication apparatus according to claim 8, further comprising:
- a clock signal transmitting unit that transmits the clock signal via a clock communication path.

11. The quantum communication apparatus according to claim 8, wherein the quantum signal detecting unit includes a quantum signal demodulating unit that implements a signal demodulation to the quantum signal present on the quantum communication path, in timing with the trigger signal output from the timing adjusting unit, and detects a quantum signal to which the signal demodulation has been implemented by the quantum signal demodulating unit, in timing with the trigger signal output from the timing adjusting unit.

12. The quantum communication apparatus according to claim 8, wherein the quantum signal detecting unit includes a quantum signal diverging unit for diverging the quantum communication path, and detects a quantum signal present on a quantum communication path which is diverged by the quantum signal diverging unit, in timing with the trigger signal output from the timing adjusting unit.

13. A quantum communication system for transmitting and receiving a photon output as a quantum signal, from a single-photon source that outputs a photon by pulse driving, comprising:
- a quantum communication path for conveying the quantum signal output from the single-photon source;
- a heralding signal communication path for conveying a heralding signal indicating that the quantum signal is present on the quantum communication path;
- a first quantum communication apparatus which includes
- a first timing adjusting unit that outputs as a first trigger signal, the heralding signal in synchronization with a clock signal for pulse driving the single-photon source,
- a quantum signal modulating unit that implements a signal modulation to the quantum signal, in timing with the first trigger signal output from the first timing adjusting unit, and transmits a quantum signal to which the signal modulation has been implemented, via the quantum communication path, and
- a heralding signal transmitting unit that transmits the heralding signal via the heralding signal communication path; and
- a second quantum communication apparatus which includes
- a heralding signal receiving unit that receives the heralding signal transmitted by the heralding signal transmitting unit via the heralding signal communication path,
- a second timing adjusting unit that outputs as a second trigger signal, the heralding signal received by the heralding signal receiving unit in synchronization with the clock signal, and
- a quantum signal detecting unit that detects the quantum signal transmitted onto the quantum communication path by the quantum signal modulating unit, in timing with the second trigger signal output from the second timing adjusting unit.

14. The quantum communication system according to claim 13, further comprising: a clock communication path for conveying the clock signal;
- wherein the first quantum communication apparatus further includes a clock signal transmitting unit that transmits the clock signal via the clock communication path,
- the second quantum communication apparatus further includes a clock signal receiving unit that receives the clock signal transmitted by the clock signal transmitting unit, via the clock communication path, and
- the second timing adjusting unit outputs as the second trigger signal, the heralding signal received at the heralding signal receiving unit in synchronization with the clock signal received at the clock signal receiving unit.

15. The quantum communication system according to claim 13, further comprising: a clock communication path for conveying the clock signal,
- wherein the second quantum communication apparatus further includes a clock signal transmitting unit that transmits the clock signal via the clock communication path,
- the first quantum communication apparatus further includes a clock signal receiving unit that receives the clock signal transmitted by the clock signal transmitting unit via the clock communication path,
- the first timing adjusting unit outputs as the first trigger signal, the heralding signal in synchronization with the clock signal received by the clock signal receiving unit.

16. The quantum communication system according to claim 13, wherein the quantum communication path uses a dispersion compensation fiber subsequently to an optical fiber.

17. A quantum communication method for transmitting and receiving a photon output as a quantum signal, from a single-photon source that outputs a photon by pulse driving, via a quantum communication path, comprising:
- outputting as a first trigger signal, a heralding signal that indicates a presence of the quantum signal on the quantum communication path in synchronization with a clock signal for pulse driving the single-photon source, at a first quantum communication apparatus;
- implementing a signal modulation to the quantum signal, in timing with the first trigger signal output by the outputting of the first trigger signal, and transmitting a quantum signal to which the signal modulation has been implemented via the quantum communication path, at the first quantum communication apparatus;
- transmitting the heralding signal via the heralding signal communication path, at the first quantum communication apparatus;

receiving the heralding signal transmitted by the transmitting of the heralding signal, via the heralding signal communication path, at a second quantum communication apparatus;

outputting as a second trigger signal, the heralding signal received by the receiving of the heralding signal in synchronization with the clock signal, at the second quantum communication apparatus; and detecting the quantum signal transmitted onto the quantum communication path by the transmitting of the quantum signal, in timing with the second trigger signal output by the outputting of the second trigger signal, at the second quantum communication apparatus.

* * * * *